United States Patent [19]

Igarashi et al.

[11] Patent Number: 4,837,115
[45] Date of Patent: Jun. 6, 1989

[54] THERMOPLASTIC POLYESTER COMPOSITION HAVING IMPROVED FLAVOR-RETAINING PROPERTY AND VESSEL FORMED THEREFROM

[75] Inventors: Reiko Igarashi, Tokyo; Yoshihiko Watanabe, Yokohama; Sadao Hirata, Kamakura, all of Japan

[73] Assignee: Toyo Seikan Kaisha, Ltd., Tokyo, Japan

[21] Appl. No.: 79,387

[22] Filed: Jul. 30, 1987

[30] Foreign Application Priority Data

Jul. 30, 1986 [JP] Japan .................................. 61-177832
Apr. 23, 1987 [JP] Japan ................................... 62-98596
Jul. 16, 1987 [JP] Japan .................................. 62-176028

[51] Int. Cl.[4] ........................ B65D 23/00; B29C 49/06
[52] U.S. Cl. .................................. 428/36.92; 264/523; 428/474.4; 428/475.2; 428/480; 525/425
[58] Field of Search ..................... 428/35, 474.4, 475.2, 428/480; 525/425; 264/523

[56] References Cited

U.S. PATENT DOCUMENTS

| 4,052,481 | 10/1977 | Asahara et al. | 525/425 |
| 4,223,128 | 9/1980 | Halek et al. | 528/503 |
| 4,361,681 | 11/1982 | Bernhardt | 528/305 |
| 4,501,781 | 2/1985 | Kushida et al. | 525/425 |
| 4,536,531 | 8/1985 | Ogawa et al. | 525/437 |
| 4,572,852 | 2/1986 | Gartland et al. | 428/35 |

Primary Examiner—Ellis P. Robinson
Assistant Examiner—James J. Seidleck
Attorney, Agent, or Firm—Sughrue, Mion, Zinn, Macpeak and Seas

[57] ABSTRACT

In a vessel composed of a thermoplastic polyester such as polyethylene terephthalate, by incorporating a predetermined amount of a terminal amino group-containing polyamide or an amino group-containing compound into the polyester, acetaldehyde formed in the vessel wall can be effectively caught.

17 Claims, 2 Drawing Sheets

THERMOPLASTIC POLYESTER COMPOSITION HAVING IMPROVED FLAVOR-RETAINING PROPERTY AND VESSEL FORMED THEREFROM

BACKGROUND OF THE INVENTION (1) Field of the Invention

The present invention relates to a thermoplastic polyester composition having an excellent gas barrier property and an improved flavor-retaining property, and a vessel formed therefrom. More particularly, the present invention relates to a thermoplastic polyester composition having an excellent gas barrier property, in which by reducing the concentration of acetaldehyde contained in the polyester, the storage property of a food or the like and the flavor-retaining property and fragrance-retaining property are highly improved, and a vessel formed from this thermoplastic polyester composition.

(2) Description of the Prior Art

Since polyethylene terephthalate is excellent in mechanical properties such as formability and creep resistance and can be biaxially molecularly oriented, polyethylene terephthalate is widely used for the production of light-weight plastic vessels excellent in creep resistance, impact resistance, rigidity, gas barrier property, light weight and transparency, especially bottles for drinks. However, the gas permeability of a polyester bottle is much higher than that of a glass bottle and cannot be neglected. For example, it is said that in case of a small bottle having a volume smaller than 1 liter, which is filled with a carbonated drink such as cola, the storage period is about 2 months at longest.

Thermoplastic polyesters excellent in the gas barrier property have already been proposed and known. For example, in the specification of U.S. Pat. No. 4,398,017, it is taught that a copolyester comprising terephthalic acid and isophthalic acid as the acid component and etheylene glycol and bis (2-hydroxyethyoxy)benzene as the diol component is excellent in the gas barrier property.

However, a thermoplastic polyester is defective in that at the heat-molding step, acetaldehyde is formed by thermal decomposition of the polyester and when the thermoplastic polyester is formed into a vessel, this acetaldehyde in the vessel wall migrates into a content and the flavor or fragrance of the content is degraded.

The concentration of acetaldehyde contained in the polyester is especially high in the above-mentioned gas barrier polyester, and it was confirmed that the aldehyde concentration in the above-mentioned gas barrier polyester is 2 to 5 times as high as in polyethylene terephthalate. Accordingly, if the gas barrier polyester is used as a constituent material of a vessel, permeation of gases such as oxygen and carbon dioxide gas and permeation of flavor and aroma components can be controlled, but because of migration of acetaldehyde into the content, it is impossible to attain the intended effects sufficiently.

SUMMARY OF THE INVENTION

It is therefore a primary object of the present invention to reduce the concentration of acetaldehyde contained in a gas barrier thermoplastic polyester by simple means and improve the flavor-retaining property and fragrance-retaining property of a content in a vessel formed from this gas barrier thermoplastic polyester.

More specifically, in accordance with the present invention, there is provided a thermoplastic polyester composition having an improved flavor-retaining property, which comprises (A) a thermoplastic polyester having ethylene terephthalate unites and (B) $3 \times 10^{-7}$ to 10.0% by weight, based on the polyester, of a thermoplastic polyamide having a terminal amino group concentration of 0.05 to 50 millimoles per 100 g of the resin.

The vessel of the present invention is obtained by heat-molding or draw-forming the above-mentioned composition.

In accordance with another embodiment of the present invention, there is provided a vessel formed of a resin composition comprising (A) the above-mentioned thermoplastic resin and (C) $5 \times 10^{-7}$ to 3.0% by weight, based on the polyester, of a primary amino group-containing compound having a molecular weight of at least 100, except a polyamide.

It is considered that formation of acetaldehyde by thermal decomposition of the polyester is caused by decomposition of the hydroxy terminal group of the polymer, represented by the following formula:

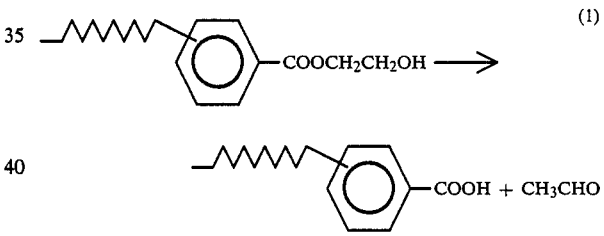

and decomposition of the main chain of the polymer, represented by the following formula:

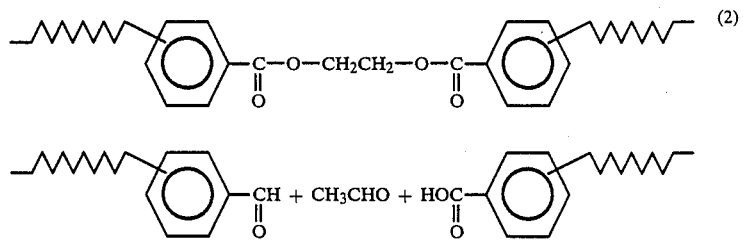

Formation of acetaldehyde by this thermal decomposition is caused not only in polyethylene terephthalate but also in other polyesters comprising ethylene glycol as the diol component, such as thermoplastic copolyesters, for example, a gas barrier copolyester comprising terephthalic acid and isophthalic acid as the dicarboxylic acid component and ethylene glycol and bis(2-hydroxyethoxy)benzene as the diol component.

The present invention is based on the finding that if a polyamide having a specific terminal amino group concentration or an amino group-containing compound having a specific molecular weight is incorporated into a polyester, the acetaldehyde concentration in a heat-formed vessel wall is prominently reduced even though the amount incorporated of the polyamide or amino group-containing compound is relatively small.

Namely, the terminal amino group-containing polyamide or amino group-containing compound used in the present invention acts as an agent for reducing the aldehyde concentration in the polyester. Although the functional mechanism has not been completely elucidated, it is believed that one reason is that acetaldehyde is caught by the amino group according to the following reaction:

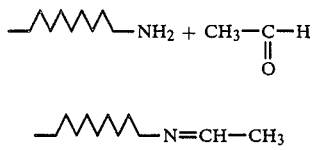
(3)

Figure 1:
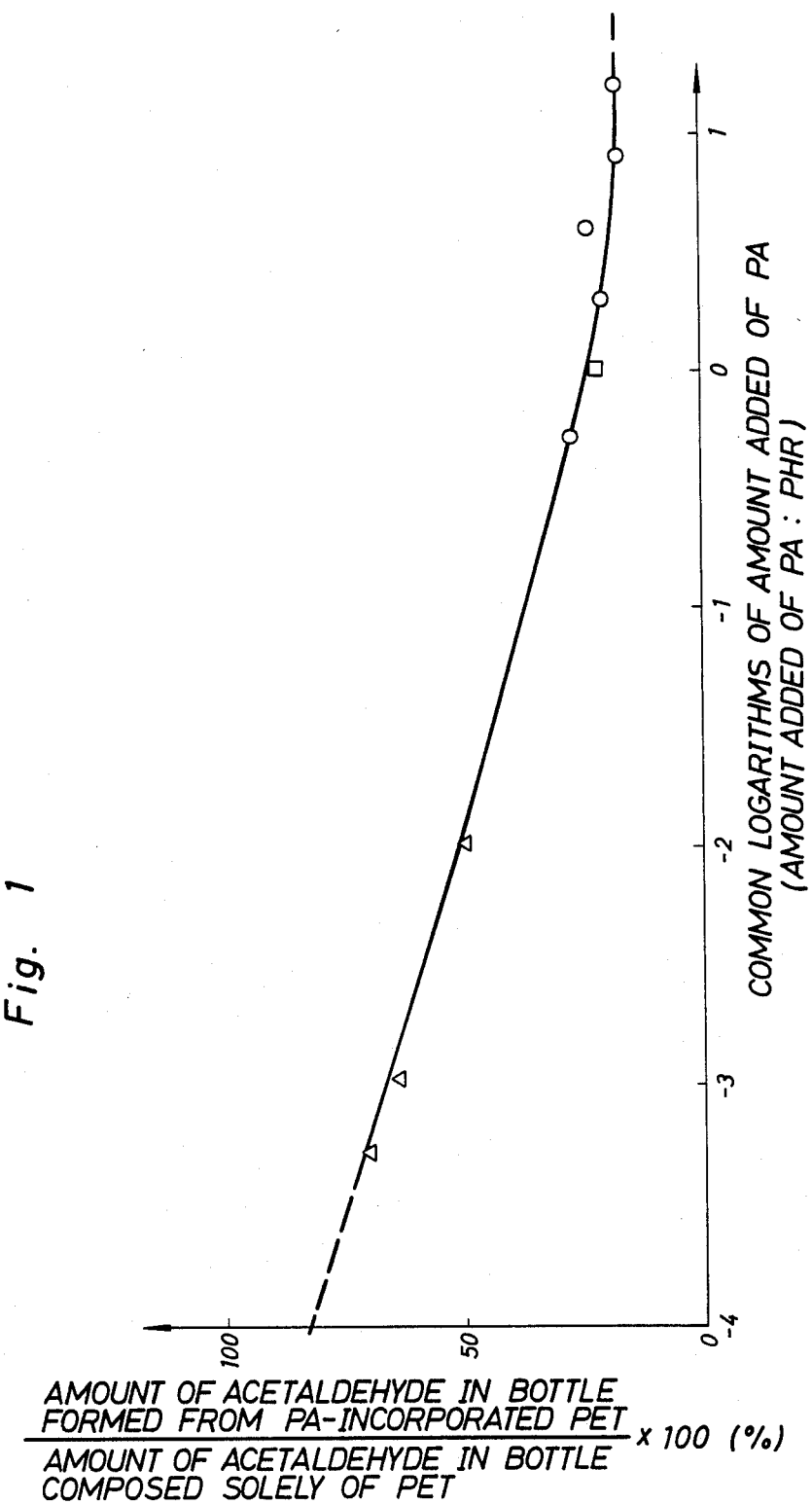
FIG. 1 is a graph illustrating the relation between the amount of a polyamide added to 100 parts by weight of polyethylene terephthalate and the residual ratio of acetaldehyde in the polyester.

DETAILED DESCRIPTION OF THE PREFERRED EMBODIMENTS Thermoplastic Polyester

In the present invention, a polyester composed mainly of ethylene terephthalate units and a copolyester comprising in the polymer chain a terephthalic acid component (T), an isophthalic acid component (I), an ethylene glycol component (E) and a bis(2-hydroxyethoxy)benzene component (BHEB) are used as the thermoplastic polyester. The former polyester is advantageous in that it is excellent in draw-formability, mechanical properties and transparency. As the polyester composed mainly of ethylene terephthalate units, a polyester in which at least 80 mole%, especially at least 90 mole%, of the acid component is terephthalic acid and at least 80 mole%, especially at least 90 mole%, of the diol component is ethylene glycol is preferred, and polyethylene terephthalate is most preferred. Of course, a modified copolyester can be used, so far as the inherent properties of polyethylene terephthalate are not degraded by the modification. For example, copolyesters comprising isophthalic acid, p-β-hydroxyethoxybenzoic acid, naphthalene-2,6-dicarboxylic acid, diphenoxyethane-4,4'-dicarboxylic acid, 5-sodium-sulfoisophthalic acid, adipic acid, sebacic acid or an alkyl ester thereof as the other dicarboxylic acid component and propylene glycol, 1,4-butane-diol, neopentyl glycol, 1,6-hexylene glycol, cyclohexane dimethanol or an ethylene oxide adduct of bisphenol A as the other glycol component can be used. The latter copolyester is advantageous in that the oxygen permeation coefficient (PO$_2$) is about ½ to about ¼ of that of polyethylene terephthalate, the oxygen permeation coefficient has no substantial moisture dependency, heat molding can be performed more stably than in case of other gas barrier resins and the adhesiveness to polyethylene terephthalate is very good. This copolyester (often called "gas barrier polyester" hereinafter) comprises in the polymer chain the terephthalic acid component (T) and the isophthalic acid component (I) at a T/I molar ratio of from 95/5 to 5/95, especially from 75/25 to 25/75, and the ethylene glycol component (E) and the bis(2-hydroxyethoxy)benzene component (BHEB) at an E/BHEB molar ratio of from 99.999/0.001 to 2.0/98.0, especially from 99.95/0.05 to 40/60. 1,3-Bis(2-hydroxyethoxy)-benzene is preferred as BHEB.. Of course, the gas barrier polyester (BPR) used in the present invention may contain a small amount of other dibasic acid component of diol component, so far as the inherent properties of the gas barrier polyester are not degraded. For example, BRP may contain a hydroxycrboxylic acid such as p-β-hydroxyethoxybenzoic acid, a dicarboxylic acid such as naphthalene-2,6-dicarboxylic acid, diphenoxyethane-4,4'-dicarboxylic acid, 5-sodium-sulfoisophthalic acid, adipic acid, debacic acid or an alkyl ester derivative thereof, or a glycol such as propylene glycol, 1,4-butane-diol, neopentyl glycol, 1,6-hexylene glycol, cyclohexane dimethanol or an ethylene oxide adduct of bisphenol A.

The polyester to be used in the present invention sould have at least a film-forming molecular weight, and it is preferred that the inherent viscosity (η) of the polyester be 0.3 to 2.8 dl/g, especially 0.4 to 1.8 dl/g, as measured at a temperature of 30° C. in a mixed solvent comprising phenol and tetrachloroethane at a weight ratio of 60/40. Of these polyesters, a polyester having a relatively low molecular weight is used for the injection molding and a polyester having a relatively high molecular weight is used for the extrusion molding.

Polyamide

It is important that the terminal amino group-containing polyamide to be used in the present invention should contain terminal amino groups at a concentration of 0.05 to 50 millimoles per 100 g of the polyamide resin, preferably 0.1 to 40 millimoles per 100 g of the polyamide resin. If the terminal amino group concentration is to low and below the above-mentioned range, the acetaldehyde-catching capacity is insufficient. If the terminal amino group concentration is too high and exceeds the above-mentioned range, reduction of the flavor-retaining property of the vessel is often caused by incorporation of the polyamide.

In the present invention, the polyamide is incorporated in an amount of $3 \times 10^{-7}$ to 10.0% by weight, preferably $5 \times 10^{-7}$ to 10.0% by weight, especially preferably $5 \times 10^{-4}$ to 5.0% by weight, based on the thermoplastic polyester. If the amount of the polyamide is too small and below the above-mentioned range, the reduction of the acetaldehyde concentration is insufficient. Generally, the amount of residual acetaldehyde decreases with increase of the amount incorporated of the polyamide. However, even if the amount of the polyamide exceeds the above-mentioned range, the residual ratio of acetaldehyde is not further reduced by saturated, and incorporation of a large amount of the polyamide is not preferred from the viewpoint of the transparency and mechanical characteristics of the polyester.

In the present invention various homopolyamides, copolyamides and blends thereof can be used as the terminal amino group-containing polyamide, so far as the above-mentioned conditions are satisfied.

Specific examples of the terminal amino group-containing polyamide used in the present invention will now be described:

(i) Homopolyamides and copolyamides comprising amide recurring units represented by the following formula and blends thereof:

or

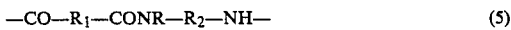

wherein R stands for a linear alkylene group, and $R_1$ and $R_2$ stands for an alkylene group, an arylene group or a combination thereof, with the proviso that at least one of $R_1$ and $R_2$ is an alkylene group. In view of the acetaldehyde-catching capacity, it is preferred that a homopolyamide or copolyamide containing 1 to 30 amide groups, especially 2 to 25 amide groups, per 100 carbon atoms, or a blend thereof be used. As preferred examples of the homopolyamide, there can be mentioned polycapramide (nylon 6), poly-ω-aminoheptanoic acid (nylon 7), poly-ω-aminononanoic acid (nylon 9), polyundecane-amide (nylon 11), polyauryllactam (nylon 12), polyethylene-adipamide (nylon 2,6), polytetramethylene-adipamide (nylon 4,6), polyhexamethylene-adipamide (nylon 6,6), polyhexamethylene-sebacamide (nylon 6,10), polyhexamethylene-dodecamide (nylon 6,12), polyoctamethylene-adipamide (nylon 8,6), polydecamethylene-adipamide (nylon 10,6), polydodecamethylene-adipamide (nylon 12,6) and polydodecamethylene-sebacamide (nylon 12,8).

As preferred examples of the copolyamide, there can be mentioned a caprolactam/lauryl-lactam copolymer, a caprolactam/hexamethylene diammonium adipate copolymer, a lauryl-lactam/hexamethylene diammonium adipate copolymer, a lauryl-lactam/hexamethylene diammonium adipate copolymer, a hexamethylene diammonium adipate/hexamethylene diammonium sebacate copolymer, an ethylene diammonium adipate/hexamethylene diammonium adipate copolymer and a caprolactam/hexamethylene diammonium adipate/hexamethylene diammonium sebacate copolymer.

Furthermore, thermoplastic polyamides comprising 1 to 100 mole% of recurring units represented by the following formula (6):

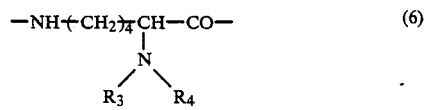

wherein $R_3$ and $R_4$ stand for a hydrogen atom or a lower alkyl group, and 0 to 99 mole% of recurring units represented by the following formula (7):

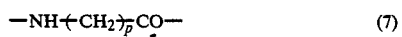

wherein p is an integer of from 2 to 11, as disclosed in Japanese Patent Application Laid-Open Specification No. 159052/85, such as poly(α-(N,N-dimethylamino)-ε-caprolactam and an α-(N,N-dimethylamino)-ε-caprolactam/ε-caprolactam copolymer.

Instead of the above-mentioned aliphatic polyamides, there can be mentioned aromatic polyamides, for example, wholly aromatic polyamides comprising in the molecule chain at least 70 mole% of structural units derived from m-xylylene diamine or a xylylene diamine mixture comprising m-xylylene diamine and up to 30% of p-xylylene diamine and an α,ε-aliphatic dicarboxylic acid having 6 to 10 carbon atoms, as disclosed in Japanese Patent Publications No. 1156/75, No. 5751/75, No. 5753/75 and No. 10196/75 and Japanese Patent Application Laid-Open Specification No. 29697/75, such as poly-m-xylylene-adipamide.

These homopolyamides and copolyamides may be used in the form of so-called blends. For example, there can be used a polycapramide/polyhexamethylene-adipamide blend, a polycapramide/(caprolactam/hexamethylene diammonium adipate) copolymer blend, a polycapramide/poly(α-(N,N-dimethylamino)-ε-caprolactam blend and a polyhexamethylene-adipamide/poly-m-xylylene-adipamide blend.

(ii) Substantially linear co-condensation polyamides comprising 35 to 50 mole% of dicarboxylic acid component units containing 30 to 100 mole% of isophthalic acid component units, 35 to 50 mole% of diamine component units composed mainly of m-xylylene diamine component units and 0 to 30 mole% of units of an aminocarboxylic acid component having 5 to 12 carbon atoms, as disclosed in Japanese Patent Application Laid-Open Specifications No. 232952/85 and No. 240452/85.

(iii) Polymerized fatty acid polyamides obtained by copolycondensing a polymerized fatty acid formed by polymerizing an unsaturated fatty acid (such as linolic acid or linoleic acid) with a diamine under heating in the molten state, such as a polycondensate of dimerized linoleic acid with hexamethylene-diamine.

The molecular weight of the polyamide is not particularly critical, so far as the polyamide has a film-forming property. However, it is preferred that the relative viscosity ($\eta$rel) be 0.4 to 4.5 as determined at 25° C. with respect to a solution of 1 g of the polymer in 100 ml of 96% sulfuric acid.

In the present invention, it is preferred that the amount of the polyamide per 100 g of the polyester, which is represented by a product of $C \times S \times 100$ in which C represents the concentration of the terminal amino groups in the polyamide (millimoles per 100 g of the resin) and the amount incorporated of the polyamide (grams per 100 g of the polyester), be $2 \times 10^{-3}$ to 20 millimoles, especially $6 \times 10^{-3}$ to 1 millimole.

Incidentally, the terminal amino group concentration can be adjusted by the adjustment of the molecular weight, the adjustment of the reaction molar ratio between the diamine component and the dicarboxylic acid component, or the terminal treatment at the time of completion of the polymerization.

Amino Group-Containing Compound

In the present invention, an amino group-containing compound having a molecular weight of at least 100, except a polyamide, can be used instead of the polyamide. A compound containing a primary amino group at a concentration of 0.05 to 3000 meq, especially 0.1 to 2000 meq, per 100 g of the compound is preferably used as the amino group-containing compound. If the concentration of the primary amino group is too low and below the above-mentioned range, the acetaldehyde-catching catching capacity is degraded. If the primary amino group concentration is to high and exceeds the above-mentioned range, the extractability is increased and no good results can be obtained.

It is indispensable that the primary amino group-containing compound used in the present invention should be stable at a heat-molding temperature for the polyester and should be compatible to some extent with the polyester.

The primary amino group-containing compound may be an aliphatic or aromatic low-molecular-weight amino group-containing compound or a polymeric amino group-containing compound. Furthermore, this primary amino group-containing compound may be a synthetic substance or a living body substance (natural substance). As preferred examples of the primary amino group-containing compound, there can be mentioned aromatic amines such as 4,4'-diaminodiphenylmethane, 4,4'-diaminodiphenylether, 4,4'-diaminodiphenylsulfone and 2,2-bis(4-aminophenyl)propane, triazine compounds such as melamine, benzoguanamine, propioguanamine, stearoguanamine and spiroguanamine, aliphatic amines such as stearyl amine, lauroyl amine, eicosyl amine, spiroacetal amine and polyoxyethylene diamine, amino group-containing polymers such as amino group-terminated polyethers, for example, aminoethyletherified or aminopropyl-etherified polyethylene glycol and/or polypropylene glycol, amino group-terminated polyesters, for example, aminoethyletherified or aminopropyl-etherified polyethylene adipate or sebacate, amino group-terminated polyurethanes, amino group-terminated polyureas, amino group-containing acrylic resins, for example, copolymers of an amino group-containing acrylate or methacrylate such as 2-aminoethyl acrylate, 2-aminoethylmethacrylate, 3-aminoethyl acrylate, 3-aminoethyl methacrylate, N-(2-aminoethyl)aminoethyl methacrylate or N-(2-aminoethyl)aminopropyl methacrylate with methyl methacrylate, ethyl acrylate or styrene, amino group-modified olefin resins, for example, polyethylene, polypropylene and ethylene/propylene copolymers graft-modified with an amino group-containing acrylate or methacrylate, amino group-containing organopolysiloxane, for example, organopolysiloxanes containing 3-aminoalkylsiloxane units and units of dimethylsiloxane, diphenylsiloxane or methylphenyl siloxane, primary amino group-containing melamine resins, primary amino group-containing guanamine resins and primary amino group-containing alkyd resins, for example, aminoalcohol-modified alkyd resins, living body amines such as agmatine, alcaine, octopamine, D-octopine, cadaverine, cystamine, cysteamine, spermidine, spermine, tyramine, tryptamine, noradrenaline, histamine, biciathine, hydroxytyramine, 5-hydroxytryptamine and hypotaurine, amino acids such as azaserine, L-asparagine, L-aspartic acid, L-α-aminobutyric acid, γ-aminobutyric acid, L-alginine, L-alloisoleucine, L-allo-threonine, L-isoleucine, L-ethionine, L-ornithine, L-canavanine, L-carboxymethylcysteine, L-kynurenine, glycine, L-glutamine, L-glutamic acid, creatine, L-cystathionine, L-cysteine, L-cysteic acid, L-cystine, L-citrulline, 3,4-dihydroxyphenylalanine, L-3,5-idotryosine, L-serine, L-thyroxine, L-tyrosine, L-tryptophane, L-threonine, norvaline, norleucine, L-valine, L-histidine, L-hydroxyproline, L-hydroxylysine, L-phenylalanine, L-α-phenylglycine, L-homoserine, L-methionine, L-1-methylhistidine, L-lanthionine, L-lysine and L-leucine, peptides such as actinomycin $C_1$, apamin, eledoysin, oxytocin, gastrin, I. L-carnosine, L-glutathione (reduction type), L-glutathione (oxidation type), L-γglutamyl-L-cysteine, L-cysteinylglycine, vasopressin and α-melanotropin, and proteins such as insulin, α-chymotrypsin, glucagon, clupein, corticotropin, satilysin, secretin, cytochrome C, throcalcitonin, trypsin, papain, histone, ferredoxin, proinsulin, pepsin, hemoglobin, myoglobin, lactalbumin and lysozyme.

It is preferred that the organic/(organic+inorganic) ratio of the primary amino group-containing compound, calculated according to the method described in "Domain of Chemistry", Volume 11, No. 10 (October 1957), pages 719 to 725, be at least 0.10, especially 0.20. Incidentally, the above-mentioned organic and inorganic values are calculated based on the standard shown in Table A. Incidentally, the above-mentioned ratio of an inorganic compound is zero and the abovementioned ratio of a linear aliphatic hydrocarbon is 1.

TABLE A

| | Organic | Inorganic |
|---|---|---|
| C(hydrocarbon) | 20 | — |
| —N (amino group) | — | 70 |
| —O— | — | 20 |
| CO | 20 | 65 |
| —OH | — | 100 |
| —COOR | 20 + 20 × (carbon number of R) | 60 |
| —O—CO—O | 20 | 80 |
| —CONH— | 20 | 200 |
| —CO—NH—CO— | 40 | 230 |
| —NH—CO—NH— | 20 | 220 |
| benzene nucleus | 120 | 15 |
| ring(non-aromatic single ring) | 20 × (carbon number in ring) | 10 |
| triple bond | — | 3 |
| double bond | — | 2 |
| iso-branch | −10 | — |
| tert-branch | −20 | — |

Resin Composition

The resin composition of the present invention comprises (A) the above-mentioned thermoplastic polyester and (B) the above-mentioned terminal amino group-containing polyamide or (C) the above-mentioned amino group-containing compound. Known additives such as colorants, fillers, surface active agents, lubricants, ultraviolet absorbers, antioxidants and nucleating agents may be incorporated into the resin composition according to known recipes.

At least one thermoplastic resin, other than the above-mentioned thermoplastic resins, may be incorporated as a modifier into the resin composition of the present invention. As the modifier resin, there can be mentioned, for example, olefin resins such as polyethylene, polypropylene, an ethylene/propylene copolymer, an ethylene/butene-1 copolymer and an ionomer (ion-crosslinked olefin copolymer), other thermoplastic polyesters such as polyethylene terephthalate, polycarbonates and polyarylates. It is preferred that the modifier resin be incorporated in an amount of up to 100 parts by weight, especially up to 80 parts by weight, per 100 parts by weight of the resin composition.

For the preparation of the resin composition, there may be adopted, for example, a method in which pellets or powders of a plurality of resins to be blended are dry-blended, melt-kneaded and pelletized. Since it is preferable to mix the components intimately, there is advantageously adopted a method in which a plurality of kinds of pellets or powders are intimately mixed by a Henschel mixer or the like and the mixture is then melt-kneaded. Furthermore, there is advantageously adopted a method in which a small amount of the polyester is dry-blended with the polyamide or amino group-containing compound optionally together with the above-mentioned thermoplastic resin such as polyethylene terephthalate, the blend is melt-kneaded to form a master batch, the remainder of the polyester optionally together with the above-mentioned thermoplastic resin such as polyethylene terephthalate is blended into the master batch and the mixture is melt-kneaded.

The polyester resin composition of the present invention can be used for various purposes, for example, for formation of films, formation of vessels, lamination, extrusion coating and powder coating.

Vessel and Forming Method

The vessel of the present invention can be formed according to known means except that the above-mentioned resin composition is used. For example, a sheet, pipe or bottomed preform for the production of a hollow vessel is easily prepared by extrusion molding, injection molding, compression molding or a combination thereof. In the production of such a sheet, pipe or bottomed preform, it is preferred that the polyester in the portion to be draw-formed be substantially amorphous. Of course, in the portion not to be draw-formed, for example, a portion corresponding to a neck or bottom of a bottle, the polyester may be heat-crystallized. The method for forming such a sheet, pipe or bottomed preform into a vessel is not particularly critical. For example, a cup-shaped vessel having a monoaxially oriented side wall or a bottomed plastic barrel to be wrap-seamed with a metal lid can be obtained by stretch-forming a sheet, and a bottomed preform for the draw-blow forming can be obtained by bottoming a pipe. Furthermore, a plastic barrel to be warp-seamed with a metal lid on each end can be obtained by biaxially drawing a pipe or by biaxially draw-blow-forming a pipe. Moreover, a biaxially oriented plastic bottle can be obtained by drawing a bottomed preform in the axial direction and expansion-drawing the preform in the circumferential direction. In order to improve the heat resistance, these draw-formed vessels can be heat-treated under a shape-restricting condition, for example, in a mold, to effect heat-setting of the orientation.

The resin composition of the present invention can also be applied to the production of a film vessel. In this case, the resin composition is formed into a film according to the T-die method or the like, and the film is drawn at a drawing temperature in the longitudinal direction and simultaneously drawn in the lateral direction by a tenter or the like to form a biaxially drawn film. This biaxially drawn film is used for the production of a vessel.

Still further, the resin composition of the present invention can be used for the production of a tray-shaped vessel for cooking a food by an electronic range and/or an oven toaster. For example, the resin composition is formed into a tray and the heat resistance is improved by heat crystallization.

The polyester resin composition of the present invention alone can be used for the production of the above-mentioned vessels. Moreover, the polyester resin composition can be used in the form of a laminate with other material, especially other thermoplastic resin, for the production of vessels. Since the resin composition (GCP) comprising the gas barrier polyester (BPR) as the polyester is excellent in the adhesiveness to polyethylene terephthalate (PET), this polyester composition can be advantageously used in the form of a laminate with PET for the production of vessels. For example, there can be mentioned the following laminates (the left side in the following description corresponds to the inner side of the vessel).

(1) Asymmetric Two-Resin Two-Layer laminate GCP/PET, PET/GCP, BL/PET and PET/BL (BL stands for a blend of GCP and PET, such as a scrap)

(2) Symmetric Two-Resin Three-Layer Laminate PET/GCP/PET (3) Asymmetric Three-Resin Four-Layer Laminate PET/BL/GCP/PET and PET/GCP/BL/PET (4) Symmetric Three-Resin Five-Layer Laminate PET/BL/GCP/PL/PET (5) Asymmetric Three-Layer Five-Layer Laminate PET/BL/PET/GCP/PET and PET/GCP/PET/BL/PET (6) Symmetric Three-Resin Seven-Layer Laminate PET/BL/PET/GCP/PET/BL/PET Not only polyethylene terephthalate alone but also a composition formed by incorporating the above-mentioned polyamide or amino group-containing compound into polyethylene terephthalate for reduction of the acetaldehyde concentration can be used as polyethylene terephthalate (PET) to be combined with the gas barrier polyester composition of the present invention.

In a laminate as described above, the GCP/PET thickness ratio can be in the range of from 5/1 to 1/20, especially from 2/1 to 1/10. The thickness of the GCP layer may be adjusted to 20 to 1500 $\mu$m, especially 30 to 1000 $\mu$m, according to the shape, inner volume or thickness of the final vessel.

The above-mentioned laminate is prepared by co-extrusion using a number, corresponding to the number of kinds of resins, of extruders and a multi-layer multiply die, or by co-injection using a number, corresponding to the number of kinds of resins, of injection machines, a co-injection runner and an injection mold. Formation of a vessel from the laminate can be accomplished in the same manner as in case of a single layer.

According to the present invention, by incorporating a small amount of a thermoplastic polyamide or amino group-containing compound into a specific polyester, the concentration of acetaldehyde contained in the polyester can be drastically reduced while retaining excellent mechanical properties, transparency and gas barrier property of the polyester. Accordingly, if this composition is used as a constituent material of a vessel, the properties of retaining the flavor and fragrance of the content can be prominently improved.

Therefore, the polyester composition of the present invention is advantageously used for the production of vessels for oil and fat foods such as frying oil and salad oil, flavorings such as mayonnaise, dressing and ketchup, syrups such as treacle, cakes such as soft adzuki-been jelly and jelly cake, alcoholic drinks such as shochu carbonated drinks such as cola, soda pop and plain soda, straight juices such as lemon juice, orange juice, plum juice, grape juice and strawberry juice, fruit drinks such as necta and agar-incorporated fruit drinks retortable drinks such as coffee and tea, healthy drinks such as vitamin-incorporated drink, aloe drink, herb drink, healthy vinegar drink and isotonic drink, sugar-free drinks such as green tea, seaweed drink, oolong tea, hydrangea tea, adlai drink, mate drink, persimmon leaf drink, ginseng drink, corn potage, consomme, shellfish extract drink and mineral water, and lactic acid beverage and fermented milk drink.

The present invention will now be described in detail with reference to the following examples that by no means limit the scope of the invention. Incidentally, the properties and characteristics were determined according to the following methods.

(1) Inherent Viscosity (IV) of Thermoplastic Polyester (BRP or PET)

The inherent viscosity was determined at 30° C. in a mixed solvent comprising phenol and tetrachloroethane at a weight ratio of 6/4 by using a Ubbellohde viscometer.

(2) Relative Viscosity ($\eta$rel) of Thermoplastic Polyamide (PA)

The relative viscosity was determine at 25° C. with respect to a solution of 1 g of a thermoplastic polyamide resin (often referred to as "PA" hereinafter) in 100 ml of sulfuric acid having a concentration of 96% by weight.

(3) Molecular Weight of Amino Group-Containing Compound

The molecular weight of the amino group-containing compound was calculated from the atomic weights of contained elements and the numbers of the elements in the chemical formula of the compound.

(4) Terminal or Primary Amino Group Concentration ($-NH_2$) of PA or Amino Group-Containing Compound The terminal or primary amino group was determined according to the potential difference titration method. More specifically, about 1 g of a sample of the used thermoplastic polyamide (PA) or amino group-containing compound was precisely weighed, and 50 mg of m-cresol (fraction boiling at 95° to 96° C. under 10 mmHg) formed by re-distillation of m-cresol of the special reagent grade was added to the sample. The mixture was treated in a desiccator under reduced pressure for 24 hours to form a solution. Perchloric acid of the special reagent grade (60% solution in ethyl alcohol) was added to a mixed solution comprising purified isopropyl alcohol and propylene glycol at a volume ratio of 2/1 as a potential adjusting agent so that the normality was 0.005N. The formed solution was used as the titrant. The amino group was determined from the bending point in a curve obtained by plotting the apparent potential and the consumption of perchloric acid. The potential difference titration was carried out by using a pH meter, Model HM-5 supplied the Toa Denpa Kogyo K.K.

(5) Terminal Carboxyl Group Concentration ($-COOH$) of PA

About 1 g of a sample was precisely weighed, and 50 ml of benzyl alcohol (fraction boiling at 90° to 93° C. under 10 mmHg) formed by re-distillation of benzyl alcohol of the special reagent grade was added and a solution was formed at about 150° C. A 0.01N potassium hydroxide titrant was used while using phenolphthaleine as an indicator, and the terminal carboxyl group was determined from the consumption left after subtraction of the consumption by benzyl alcohol.

(6) Acetaldehyde Amount (AA-M) in Material

The acetaldehyde amount in the material was determined according to the Celanese process. More specifically, about 1 g each of the barrel and mouth of a sample were simultaneously pulverized in liquid nitrogen, and 30 to 40 mg of the pulverization product was filled in a precisely weighed glass insert and directly introduced into an injection zone of a gas chromatograph (Model GC-6A supplied by Shimazu Seisakusho). Acetaldehyde in the material was volatilized by heating at 145° C. for 20 minutes and the analysis of acetaldehyde was carried out by elevating the temperature of a column (Polapack Q, 3 mm in diameter and 2 m in length) from room temperature to 140° C. After the measurement, the total weight of the sample and glass insert was precisely weighed, and the weight of the sample was calculated from the difference of this total weight from the weight of the glass insert. The measurement was conducted three times and the average value was calculated and shown.

(7) Amount (AA-HS) of Acetaldehyde Migrating into Space in Vessel

The inside atmosphere of a vessel just after formation was substituted by nitrogen gas by using a gas substituter so that the nitrogen gas concentration was 99.99% by volume, and the mouth portion of the vessel was sealed by a nitrile rubber plug and the vessel was stored in a thermostat tank (37° C. and 20 % RH). After the lapse of a predetermined time, the gas in the space in the vessel was collected through the rubber plug in the mouth portion of the vessel by using a micro-syringe, and the amount of acetaldehyde migrating into the space in the vessel from the material of the vessel was measured by a gas chromatograph, Model 1 GC-6A supplied by Shimazu Seisakusho. The measurement was conducted on five vessels and the average value was calculated and shown.

(8) Transparency (Haze, HZ) of Vessel

The haze value (HZ) of a central part (about 0.24 mm thick) of a sample was measured by using a direct reading haze meter supplied by Toyo Seiki Seisakusho. The measurement was conducted on 5 vessels, and the average value was calculated and shown.

(9) Oxygen Gas Permeability ($QO_2$)

The inside atmosphere of a bottle was substituted in vacuo by nitrogen gas, and the contact surface portion between the mouth of the bottle and the rubber plug was covered with an epoxy type adhesive, and the bottle was stored for 5 weeks in a thermostat tank maintained 1) at a temperature of 30° C. and a relative humidity of 20% or 2) at a temperature of 30° C. and a relative humidity of 80%.

Then, the concentration of oxygen which had permeated in the bottle was measured by a gas chromatograph and the oxygen gas permeability ($QO_2$, cc/$m^2$ day atm) was calculated according to the following formula:

$$QO_2 = (m \times Ct/100)/t \times OP \times A$$

wherein m stands for the amount (ml) of nitrogen gas filled in the bottle, t stands for the time (days) of the storage in the thermostat tank, Ct stands for the oxygen concentration (% by volume) in the bottle after the lapse of t days, A stands for the effective surface area ($m^2$) of the bottle, and OP stands for the partial pressure (atm) of oxygen gas (=0.209).

With respect to each sample, five bottles were measured for each of the conditions 1) and 2), and the arithmetic mean was calculated and shown. (10) Flavor Test (FEO)

With respect to thermoplastic polyamide-added PET samples and samples of PET alone, especially those as described in Examples 5 and 6, the flavor test was carried out according to the following procedures. The bottle was fully filled with a salad oil packed in a 1400-g square can, and the mouth of the vessel was sealed and the vessel was stored in a thermostat chamber (dark place) maintained at 37° C. for 14 days. Then, about 200 ml of the salad oil was transferred into a 300-ml capacity beaker and heated at about 60° C. on a hot plate. Separately, about 200 ml of the above-mentioned salad oil packed in the square can was transferred into a 300-ml capacity beaker just after opening of the square can and heated at about 60° C. on a hot plate in the same manner as described above.

By 21 panelists, it was judged which of (1) the salad oil filled in the thermoplastic polyamide-added PET sample vessel and (2) the salad oil filled in the sample vessel composed solely of PET had a flavor closer to that of the salad oil packed in the square can just after opening of the square can.

Example 1

To 100 parts by weight of polyethylene terephthalate (PET-A) having an inherent viscosity (IV) of 0.75 dl/g was added 1.0 part by weight (sometimes referred to as "PHR" hereinafter) of polycapramide (nylon 6) having a relative viscosity ($\eta$rel) of 3.42, a terminal amino group concentration ((—NH$_2$)) of 1.637 millimoles/100 g and a terminal carboxyl group concentration (—COOH) of 1.669 millimoles/100 g, and the mixture was dry-blended by a tumbler type blender at room temperature for 10 minutes.

A perform having a weight of 37 g and a thickness of 2.6 mm was formed from the obtained dry blend by an injection molding machine, Model FS-170N supplied by Nissei Jushi Kogyo K.K. The injection molding conditions were as follows.

(1) Set Barrel Temperature 250° C. (rear part), 265° C. (intermediate part), 271° C. (front part), 272° C. (nozzle part)
(2) Screw Rotation Number 70 rpm
(3) Injection Pressure 44 kg/cm$^2$
(4) Temperature of Cooling Water 11° C.
(5) Forming Cycle 36 seconds For comparison, a preform composed solely of PET-A (weight=37 g, thickness=2.6 mm) was formed by using the same molding machine under the same molding conditions as described above.

Each of the so-obtained preform composed solely of PET-A and the preform of the blend of PET-A and 1.0 PHR of nylon 6 was formed into a cylindrical bottle having a full inner volume of about 1035 ml (the weight was 37 g) by a biaxial draw-blow forming machine, Model OBM-1G supplied by Toyo Shokuhin Kikai K.K.

For the preparation of the bottle, the preform was heated at 100° C. for 30 seconds and blow-forming was carried out for 4 seconds in the mold.

With respect to each of the two kinds of the so-obtained biaxially draw-blow-formed bottles, the acetaldehyde amount (AA-M) in the bottle material was measured according to the method described in (6) above.

It was found that AA-M in the bottle composed solely of PET was 5.90 ppm and AA-M in the bottle composed of the blend of PET and 1.0 PHR of nylon 6 was 1.26 ppm.

Accordingly, it was confirmed that by adding 1.0 PHR of nylon 6, AA-M in the bottle material was reduced to about 20%.

Example 2

To 10 kg of polyethylene terephthalate (PET-B) having an inherent viscosity (IV) of 0.65 dl/g was added 10 g of a powder of polyhexamethylene adipamide (nylon 6,6, $\eta$rel=1.27, (—NH$_2$)=4.429 millimoles/100 g, (—COOH)=4.486 millimoles/100 g) pulverized in liquid nitrogen, and they were intimately mixed by a Henschel mixer and pelletized by a pelletizer (the set temperature of the cylinder portion was 265° C. and the screw rotation number was 30 rpm) to form a PET-B/nylon 6,6 master batch.

The so-obtained master batch was dry-blended with PET-B chip (pellet) by using the same tumbler type dry blender as used in Example 1 to obtain the following three dry blends.

(1) master batch/PET-B=1/200=0.0005 PHR
(2) master batch/PET-B=1/200=0.001 PHR
(3) master batch/PET-B=1/10=0.01 PHR From the so-obtained three dry blends and PET-B alone, cylindrical bottles having a full inner volume of about 1035 ml (weight=37 g) were formed by using the same injection molding machine and biaxial draw-blow forming machine as described in Example 1 under the same injection and blow forming conditions as described in Example 1.

With respect to each of the so-obtained four biaxially draw-blow-formed bottles, the acetaldehyde amount (AA-M) in the bottle material was measured according to the method described in (6) above. The obtained results are shown in Table 1.

From the results shown in Table 1, it is seen that even if the amount added of nylon 6,6 is small, AA-M in the bottle material is reduced to 70% or less and a high effect of reducing the acetaldehyde concentration is attained.

TABLE 1

| Amount of PET (parts by weight) | Amount of Nylon (PHR) | AA-M (ppm) | Acetaldehyde residual Ratio (%) |
|---|---|---|---|
| 100 | 0 | 46.5 | 100 |
| 100 | 0.0005 | 32.8 | 70.5 |
| 100 | 0.01 | 23.2 | 49.9 |

Thermoplastic polyester: PET-B (IV = 0.65)
Thermoplastic polyamide: nylon 6,6 ((—NH$_2$) = 4.429)

Example 3

The same polyethylene terephthalate (PET-A) as used in Example 1 was dry-blended with poly-m-xylylene-adipamide (nylon MXD6) having a relative viscosity ($\eta$rel) of 2.24, a terminal amino group concentration (—NH$_2$) of 0.471 millimole/100 g and a terminal carboxyl group concentration (—COOH) of 0.483 millimole/100 g by using the same tumbler type dry blender as described in Example 1 at the following blending ratios.

(1) PET-A/MXD6-100/0.5=0.5 PHR
(2) PET-A/MXD6-100/2.0=2.0 PHR
(3) PET-A/MXD6=100/4.0=4.0 PHR
(4) PET-A/MXD6=100/8.0=8.0 PHR
(5) PET-A/MXD6-100/15.0=15.0 PHR

From these five dry blends, cylindrical bottles having a full inner volume of about 1035 ml (the weight was 37 g) were formed by using the same injection molding machine and biaxial draw-blow forming machine as described in Example 1 under the same injection and blow-forming conditions as described in Example 1.

With respect to each of the so-obtained five biaxially draw-blow-formed bottles, the acetaldehyde amount (AA-M) in the bottle material was measured according to the method described in (6) above. The obtained results are shown in Table 2. AA-M in the bottle composed solely of PeT-A described in Example 1 is shown in Table 2.

From the results shown in Table 2, it is seen that if nylon MXD6 is incorporated in an amount within the range specified in the present invention, AA-M in the bottle material is reduced to about 20%, but if MXD6 is incorporated in too large an amount, the effect of reducing AA-M is degraded.

Furthermore, with respect to each of the foregoing six bottles, the transparency (haze, HZ) of the central part of the barrel was determined according to the method described in (8) above. The obtained results are shown in Table 2.

From the results shown in Table 2, it is seen that if the amount added of nylon MXD6 exceeds 10 PHR, the transparency (HZ) of the vessel is drastically reduced.

TABLE 2

| Amount of PET (parts by weight) | Amount of Nylon (PHR) | AA-M (ppm) | Acetaldehyde Residual Ratio (%) | Transparency, HZ (%) |
|---|---|---|---|---|
| 100 | 0 | 5.90 | 100 | 1.7 |
| 100 | 0.5 | 1.58 | 26.8 | 1.6 |
| 100 | 2.0 | 1.21 | 20.5 | 2.4 |
| 100 | 4.0 | 1.35 | 22.9 | 2.9 |
| 100 | 8.0 | 1.00 | 16.9 | 3.9 |
| 100 | 15.0 | 1.03 | 17.5 | 23.2 |

Thermoplastic polyester: PET-A (IV = 0.75)
Thermoplastic polyamide: nylon MXD6 ((—NH$_2$)) = 0.471)

Example 4

The polyethylene terephthalates (PET-A and PET-B) described in Examples 1 and 2 were independently dry-blended with chips of a polymerized fatty acid polyamide (polymerized fatty acid polyamide PA) having a relative viscosity ($\eta$rel) of 0.52, a terminal amino group concentration (—NH$_2$) of 31.08 millimoles/100 g and a terminal carboxyl group concentration (—COOH) of 31.22 millimoles of 100 g, and the blends were pelletized by the same pelletizer as used in Example 2 to obtain the following two master batches (pellets).

(1) PET-A/polymerized fatty acid PA=100/10 (weight ratio)
(2) PET-B/polymerized fatty acid PA=100/10 (weight ratio)

Then, the following two dry blends were prepared by using the same tumbler type dry blender as described in Example 1.

PET-A/master batch (1)=10/1=1.0 PHR
PET-B/master batch (2)=10/1=1.0 PHR

From these dry blends, cylindrical bottles having a full inner volume of about 1035 ml (the weight was 37 g) were formed by using the same injection molding machine and biaxial draw-blow forming machine as described in Example 1 under the injection and blow-forming conditions as described in Example 1.

With respect to each of the so-obtained two biaxially draw-blow-formed bottles, the acetaldehyde amount (AA-M) in the bottle material was measured according to the method described in (6) above. The obtained results are shown in Table 3. Also the results of the measured of AA-M made on the bottles composed solely of PET-A and PET-B, respectively, described in Examples 1 and 2 are shown in Table 3.

From the results shown in Table 3, it is seen that if a small amount of a thermoplastic polyamide having a high terminal amino group concentration, such as the above-mentioned polymerized fatty acid polyamide, is incorporated, a high effect of reducing the acetaldehyde concentration can be attained.

With respect to each of the foregoing bottles, the transparency (haze, HZ) of the central part of the barrel was determined according to the method described in (8) above. The obtained results are shown in Table 3. It is seen that there is no substantial difference of the transparency.

TABLE 3

| Amount of PET (parts by weight) | Amount of PA (PHR) | AA-M (ppm) | Acetaldehyde Residual Ratio (%) | Transparency, HZ (%) |
|---|---|---|---|---|
| A/100 | 0 | 5.90 | 100 | 1.7 |
| A/100 | 1.0 | 0.77 | 13.1 | 1.5 |
| B/100 | 0 | 46.5 | 100 | 1.6 |
| B/100 | 1.0 | 2.41 | 5.2 | 1.6 |

Thermoplastic polyester: PET-A (IV = 0.75) PET-B (IV = 0.65)
Thermoplastic polyamide: polymerized fatty acid PA ((—NH$_2$) = 31.08)

Example 5

With respect to the bottle composed solely of PET-B and the bottle composed of the blend of PET-B and 0.01PHR of nylon 6,6, described in Example 2, the flavor test of the salad oil was carried out according to the method described in (10) above.

Among the 21 panelists, (I) two panelists answered that the flavor of the salad oil filled in the bottle composed solely of PET-B was closer to the flavor of the salad oil just after opening of the can, (II) 16 panelists answered that the flavor of the salad oil filled in the bottle of the blend of PET-B and 0.01 PHR of nylon 6,6 was closer to that of the salad oil just after opening of the can, and (III) three panelists answered that there was no substantial difference.

From these results, it was confirmed that the flavor of the salad oil filled in the bottle of the present invention was excellent.

Example 6

With respect to the bottle composed solely of PET-A, described in Example 1, and the bottle composed of the blend of PET-A and 2.0 PHR of nylon MXD6, described in Example 3, the flavor test of the salad oil was carried out according to the method described in (10) above.

Among the 21 panelists, (I) none answered that the flavor of the salad oil filled in the bottle composed solely of PET-A was closer to that of the salad oil just after opening of the can, (II) 19 panelists answered that the flavor of the salad oil filled in the bottle of the blend of PET-A and 2.0 PHR of nylon MXD6 was closer to that of the salad oil just after opening of the can, and (III) two panelists answered that there was no substantial difference.

From these results, it was confirmed that the flavor of the salad oil filled in the bottle of the present invention was excellent.

Example 7

To 100 parts by weight of a thermoplastic polyester (BPR-A) comprising in the polymer chain a terephthalic acid component (T) and an isophthalic acid component (I) at a molar ratio of 70/30 and an ethylene glycol component (E) and and a bis(2-hydroxyethoxy)-benzene component (BHEB) at a molar ratio of 95/5 and having an inherent viscosity (IV) of 0.69 d /g was added to 1.0 part by weight (sometimes referred to as "PHR") of polycapramide (nylon 6) having a relative viscosity ($\eta$rel) of 3.42, a terminal amino group concentration ( —NH$_2$) of 1.637 millimoles/100 g and a terminal carboxyl group concentration ( —COOH of 1.669 millimoles/100 g, and the mixture was dry-blended at room temperature of 10 minutes by millimoles/100 g, and the mixture was dry-blended at room temperature for 10 minutes by a tumbler type dry blender.

The obtained dry blend was formed into a preform having a weight of 37 g and a thickness of 2.6 mm by using an injection molding maching, Model FS-170N supplied by Nissei Jushi Kogyo K.K. The injection molding machine, Model FS-170N supplied by Nissei Jushi Kogyo K.K. The injection molding conditions were as described below.

(1) Set Barrel Temperature 200° C.(rear part), 214° C. (intermediate part), 220° C. (front part ), 220° C. (nozzle part)

(2) Screw Rotation Number 70 rpm (3) Injection Pressure 40 kg/cm$^2$ (4) Temperature of Cooling Temperature 11° C.

(5) Forming Cycle 36 seconds

For comparison, a preform composed solely of BPR-A (having a weight of 37 g and a thickness of 2.6 mm) was formed by using the above-mentioned injection molding machine under the above-mentioned forming conditions.

The so-obtained preform composed solely of BPR-A and the so-obtained preform composed of the blend of BPR-A and 1.0 PHR of nylon 6 were formed into cylindrical bottles having a full inner volume of about 1035 ml (the weight was 37 g) by a biaxial draw-blow forming machine, Model OBM-1G supplied by Toyo Shokuhin Kikai K.K.

Namely, the preform was heated at 70° C. for 30 seconds and blow-forming was carried out for 4 seconds in the mold.

With respect to each of the so-obtained two biaxially draw-blow-formed bottles and a comparative bottle composed solely of polyethylene terephthalate (PET-A) having an intrinsic viscosity (IV) of 0.75 dl/g, which was formed by using the above-mentioned injection molding machine and biaxial draw-blow forming machine and had the same weight and shape as those of the above-mentioned bottles, the acetaldehyde amount (AA-M) in the bottle material was measured according to the method described in (6) above.

It was found that AA-M in the bottle composed solely of BPR-A was 21.5 ppm but AA-M in the bottle composed of the blend of BPR-A and 1.0 PHR of nylon 6 was 2.4 ppm. It also was found that AA-M of the bottle composed solely of PET-A was 5.9 ppm.

Accordingly, it was confirmed that by addition of 1.0 PHR of nylon 6, AA-M in the bottle material was reduced to about 10% and the acetaldehyde amount (AA-M) was smaller than that in the bottle composed solely of polyethylene terephthalate (PET-A).

With respect to each of the bottle composed solely of BPR-A, the bottle composed of the blend of BPR-A and 1.0 PHR of nylon 6 and the bottle composed solely of PET-A, the oxygen gas permeability (QO$_2$) was determined according to the method described in (9) above.

When the bottles were stored at a temperature of 30° C. and a relative humidity of 20%, the oxygen gas permeabilities of the bottle composed solely of BPR-A, the bottle composed of the blend of BPR-A and 1.0 PHR of nylon 6 and the bottle composed solely of PET-A were 2.54, 2.11 and 7.66, respectively (the unit being cc/m$^2$ day atm).

When the bottles were stored at a temperature of 30° C. and a relatively humidity of 80%, the oxygen gas permeabilities of the bottle composed solely of BPR-A, the bottle composed of the blend of BPR-A and 1.0 PHR of nylon 6 and the bottle composed solely of PET-A were 2.56, 2.29 and 7.70, respectively (the unit being cc/m$^2$ day atm).

Accordingly, it was confirmed that under the above-mentioned storage conditions, the bottles of the BPR-A series had an oxygen gas permeability much lower than that of the bottle composed solely of PET-A and the bottles of the BPR-A series had an improved gas barrier property, and that the gas barrier property was not adversely influenced by addition of 1.0 PHR of nylon 6.

Example 8

To 10 kg of a thermoplastic polyester (BPR-B) comprising in the polymer chain a terephthalic acid component (T) and an isophthalic acid component (I) at a molar ratio of 40/60 and an ethylene glycol component (E) and a bis(2-hydroxyethoxy)benzene component (BHEB) at a molar ratio of 80/20 and having an inherent viscosity (IV) of 0.55 dl/g was added 10 g of a powder of polyhexamethylene-adipamide (nylon 6,6, $\eta$rel=1.27, (—NH$_2$)=4.429 millimoles/100 g, (—COOH)=4.486 millimoles/100 g), and they were intimately mixed by a Henschel mixer and pelletized by a pelletizer (the set temperature of the cylinder portion was 205° C. and the screw rotation number was 30 rpm) to obtain a BPR-B/nylon 6,6 master batch (pellet).

The following three dry blends were obtained by dry-blending the so-obtained master batch with a chip (pellet) of BPR-B by using the same tumbler type dry blender as described in Example 7.

(1) master batch/BPR-B=1/200=0.0005 PHR (2) master batch/BPR-B=1/100=0.001 PHR (3) master batch/BPR-B=1/10=0.01 PHR The so-obtained three dry blends and BPR-B alone were formed into cylindrical bottles having a full inner volume of about 1035 ml (the weight was 37 g) by using the same injection molding machine and biaxial draw-blow forming machines as described in Example 7 under the same injection and blow-forming conditions as described in Example 7.

With respect to each of the so-obtained four biaxially draw-blow-formed bottles, the acetaldehyde amount (AA-M) in the bottle material was measured. The obtained results are shown in Table 4.

It was confirmed that even if the amount added of nylon 6,6 was as small as described above, the acetaldehyde amount (AA-M) in the bottle material was reduced to about 65% or less and a high effect of reducing the acetaldehyde concentration could be attained.

With respect to each of the above-mentioned four biaxially draw-blow-formed bottles, the oxygen gas permeability was determined according to the method described in (9) above. The obtained results are shown in Table 5.

From the results shown in Table 5, it is seen that when nylon 6,6 is added in an amount as described above, the gas barrier property of the bottle is not adversely influenced.

TABLE 4

| Amount of BPR (parts by weight) | Amount of Nylon (PHR) | AA-M (ppm) | Acetaldehyde Residual Ratio (%) |
|---|---|---|---|
| 100 | 0 | 24.9 | 100 |
| 100 | 0.0005 | 16.1 | 64.7 |
| 100 | 0.001 | 14.0 | 56.2 |
| 100 | 0.01 | 10.3 | 41.4 |

TABLE 5

| Amount of BPR (parts by weight) | Amount of Nylon (PHR) | Oxygen Gas Permeability (cc/m² · day · atm) | |
|---|---|---|---|
| | | 30° C., 20% RH | 30° C., 80% RH |
| 100 | 0 | 1.97 | 2.05 |
| 100 | 0.0005 | 1.88 | 1.99 |
| 100 | 0.001 | 1.82 | 1.95 |
| 100 | 0.01 | 1.75 | 1.96 |

Example 9

The thermoplastic polyester (BPR-A) described in Example 7 was dry-blended with poly-m-xylyleneadipamide (nylon MXD6) having a relative viscosity ($\eta$rel) of 2.24, a terminal amino group concentration (—NH$_2$) of 0.471 millimole/100 g and a terminal carboxyl group concentration (—COOH) of 0.483 millimole/100 g at the following blending weight ratios by using the tumbler type dry blender described in Example 7.

(1) BPR-A/MXD6 = 100/0.5 = 0.5 PHR
(2) BPR-A/MXD6 = 100/2.0 = 2.0 PHR
(3) BPR-A/MXD6 = 100/4.0 = 4.0 PHR
(4) BPR-A/MXD6 = 100/8.0 = 8.0 PHR
(5) BPR-A/MXD6 = 100/15.0 = 15.0 PHR

From these five dry blends, cylindrical bottles having a full inner volume of about 1035 ml (the weight was 37 g) were formed by using the same injection molding machine and biaxial draw-blow forming machine as described in Example 1 under the same injection and blow-forming conditions as described in Example 7.

With respect to each of the so-obtained biaxially draw-blow-formed bottles, the acetaldehyde amount (AA-M) in the bottle material was measured according to the method described in (6) above. The obtained results are shown in Table 6. Also the results obtained with respect to the bottle composed solely of BPR-A and the bottle composed solely of PET-A, described in Example 7, are shown in Table 6.

From the results shown in Table 6, it is seen that if the amount added of nylon MXD6 is within the range specified in the present invention, the acetaldehyde amount is reduced to about 10% but if the amount added of MXD6 is further increased, the effect of reducing AA-M is rather degraded.

With respect to each of the foregoing five biaxially draw-blow-formed bottles, and the bottle composed solely of BPR-A and the bottle composed solely of PET-A, described in Example 7, the transparency (haze, HZ) of the central part of the barrel was determined according to the method described in (8) above. The obtained results are shown in Table 6.

From the results shown in Table 6, it was confirmed that if the amount added of nylon MXD6 was increased to about 15.0 PHR, the transparency (HZ) of the vessel was drastically degraded.

Furthermore, with respect to each of the foregoing five bottles of MXD6-added BPR-A, the oxygen gas permeability (QO$_2$) was determined according to the method described in (9) above. The obtained results are shown in Table 7. For comparison, also the results obtained with respect to the bottles of BPR-A and PET-A, described in Example 7, are shown in Table 7.

From the results shown in Table 7, it was confirmed that under the respective storage conditions, the oxygen gas permeability of each of the bottles of BPR-A series was lower than that of the bottle composed solely of PET-A and the gas barrier property was improved in the bottles of the BPR-A series, and that if the amount added nylon MXD6 was smaller than 15.0 PHR, no bad influences were given to the gas barrier property of the bottle. It also was confirmed that if the amount added of nylon MXD6 was 15.0 PHR or more, the humidity dependency of the oxygen gas permeability increased.

TABLE 6

| Amount of BPR (parts by weight) | Amount of MXD6 (PHR) | AA—M (ppm) | Acetaldehyde Residual Ratio (%) | Transparency, HZ (%) |
|---|---|---|---|---|
| 100 | 0 | 21.5 | 100 | 1.2 |
| 100 | 0.5 | 2.62 | 12.2 | 1.1 |
| 100 | 2.0 | 2.09 | 9.7 | 1.4 |
| 100 | 4.0 | 2.21 | 10.3 | 1.8 |
| 100 | 8.0 | 2.16 | 10.0 | 6.6 |
| 100 | 15.0 | 2.04 | 9.5 | 32.5 |
| PET = 100 | 0 | 5.90 | — | 1.7 |

TABLE 7

| Amount of BPR (parts by weight) | Amount of MXD6 (PHR) | Oxygen Gas Permeability (cc/m² · day · atm) | |
|---|---|---|---|
| | | 30° C. 20% RH. | 30° C. 80% RH. |
| 100 | 0 | 2.54 | 2.56 |
| 100 | 0.5 | 2.21 | 2.25 |
| 100 | 2.0 | 1.96 | 2.02 |
| 100 | 4.0 | 1.71 | 1.79 |
| 100 | 8.0 | 1.52 | 1.75 |
| 100 | 15.0 | 1.40 | 3.29 |
| PET = 100 | 0 | 7.66 | 7.70 |

Example 10

The thermoplastic polyesters (BRP-A and BRP-B) described in Examples 7 and 8 were independently dry-blended with chips of a polymerized fatty acid polyamide (polymerized fatty acid PA) having a relative viscosity ($\eta$rel) of 0.52, a terminal amino group concentration (—NH$_2$) of 31.08 millimoles/100 g and a terminal carboxyl group concentration (—COOH) of 31.22 millimoles/100 g at the following blending ratios.

(1) BPR-A/polymerized fatty acid PA = 100/100 (weight ratio)
(2) BPR-B/polymerized fatty acid PA = 100/10 (weight ratio)

Then, the blends were pelletized by the same pelletizer as used in Example 8 to obtain two master batches (pellets) (1) and (2).

By using these master batches, the following two dry blends were prepared by using the tumbler type dry blender described hereinbefore.

BPR-A/master batch (1) = 10/1 = 1.0 PHR
BPR-B/master batch (2) = 10/1 = 1.0 PHR

From these dry blends, cylindrical bottles having a full inner volume of about 1035 ml (the weight was 37 g) were formed by using the same injection molding machine and biaxial draw-blow-forming machines as described in Example 7 under the same injection and blow-forming conditions as described in Example 7.

With respect to each of the so-obtained biaxially draw-blow-formed bottles, the acetaldehyde amount (AA-M) in the bottle material was determined according to the method described in (6) above. The obtained results are shown in Table 8. For reference, the acetaldehyde amounts in the bottles of BPR-A and BPR-B described in Examples 7 and 8 are shown in Table 8 again.

From the results shown in Table 8, it is seen that by addition of a small amount of a thermoplastic polyamide having a high terminal amino group concentration, such as a polymerized fatty acid polyamide, a high effect of reducing the acetaldehyde concentration can be obtained.

Moreover, with respect to each of the foregoing bottles, the transparency (haze, HZ) of the central part of the barrel was measured. The obtained results are shown in Table 8. It was confirmed that there was no significant difference of the transparency.

With respect to each of the above-mentioned two biaxially draw-blow-formed bottles, the oxygen gas permeability was determined according to the method described in (9) above. The obtained results are shown in Table 9. For comparison, the results obtained with respect to the bottles of BPR-A and BPR-B described in Examples 7 and 8 are shown in Table 9 again.

From the results shown in Table 9, it was confirmed that the addition of the polymerized fatty acid amide in amounts as described above had no bad influences on the gas barrier property of the bottle.

TABLE 8

| Amount of BPR (parts by weight) | Amount of PA (PHR) | AA—M (ppm) | Acetaldehyde Residual Ratio (%) | Transparency, HZ (%) |
|---|---|---|---|---|
| A/100 | 0 | 21.5 | 100 | 1.2 |
| A/100 | 1.0 | 1.16 | 5.4 | 1.2 |
| B/100 | 0 | 24.9 | 100 | 1.4 |
| B/100 | 1.0 | 1.25 | 5.0 | 1.3 |

TABLE 9

| Amount of BPR (parts by weight) | Amount of PA (PHR) | Oxygen Gas Permeability $cc/m^2 \cdot day \cdot atm$ | |
|---|---|---|---|
| | | 30° C. 20% RH | 30° C. 80% RH |
| A = 100 | 0 | 2.54 | 2.56 |
| A = 100 | 1.0 | 2.14 | 2.18 |
| B = 100 | 0 | 1.97 | 2.05 |
| B = 100 | 1.0 | 1.60 | 1.69 |

Example 11

The polyethylene terephthalate (PET-A) described in Example 7 was supplied to a main injection machine of a co-injection/biaxial draw-blow forming machine, Model ASB-250TH supplied by Nissei ASB Kikai K.K., and the thermoplastic polyester (BPR-A) described in Example 7 or a dry blend (GCP) comprising BRP-A and the poly-m-xylylene-adipamide (nylon MXD6) described in Example 9 at a weight ratio of 99.5/0.5 was supplied to a subsidiary injection machine of the above-mentioned machine. A multi-layer preform having a weight of 59 g and a total thickness of 4.1 mm, in which the inner layer (PET)/intermediate layer (BPR-A or GCP)/outer layer (PET) thickness ratio was 0.5/1/1.5, was formed under the following co-injection conditions.

(1) Set Temperature in Main Injection Machine 280° C. (rear part), 280° C. (intermediate part), 285° C. (nozzle part)

(2) Set Temperature in Subsidiary Injection Machine 195° C. (rear part), 215° C. (intermediate part), 215° C. (nozzle part)

(3) Set Temperature at Nozzle Part of Hot Runner 285° C.

(4) Primary Injection Pressure for PET 120 kg/cm² (gauge)

(5) Injection Pressure for Blend of BPR-A or BPR-B and MXD6 145 kg/cm² (gauge)

(6) Secondary Injection Pressure for PET 90 kg/cm² (gauge)

In the blowing zone of the above-mentioned machine, two kinds of cylindrical multi-layer bottles having a weight of 59 g and a full inner volume of 1520 ml were prepared by carrying out the biaxial draw-blow forming at a draw ratio of 2.5 in the longitudinal (axial) direction and a draw ratio of 3.5 in the lateral (circumferential) direction under the following condition.

(7) Temperature for Heating Multi-Layer Preform 100° C.

Separately, by using only the main injection machine of the above-mentioned co-injection/biaxial draw-blow forming machine, two bottles having the same weight and shape as described above were formed from the above-mentioned polyethylene terephthalate (PET-A) alone and the dry blend containing BPR-A and MXD6 at a weight ratio of 99.5/0.5, respectively.

The foregoing four bottles are designated as follows.
Bottle (a)
Bottle composed solely of PET
Bottle (b)
Co-injected and biaxially draw-blow-formed bottle having PET/BRP-A/PET structure
Bottle (c)
Co-injected and biaxially draw-blow-formed bottle having PET/GCP/PET structure
Bottle (d)
Bottle composed of blend containing BPR-A and MXD6 at weight ratio of 99.5/0.5

With respect to each of these four biaxially draw-blow-formed bottles, the amount (AA-HS) of acetaldehyde migrating into the space of the bottle was determined according to the method described in (7) above. The measurement period was 13 weeks at longest. The obtained results are shown in FIG. 2.

Figure 2:
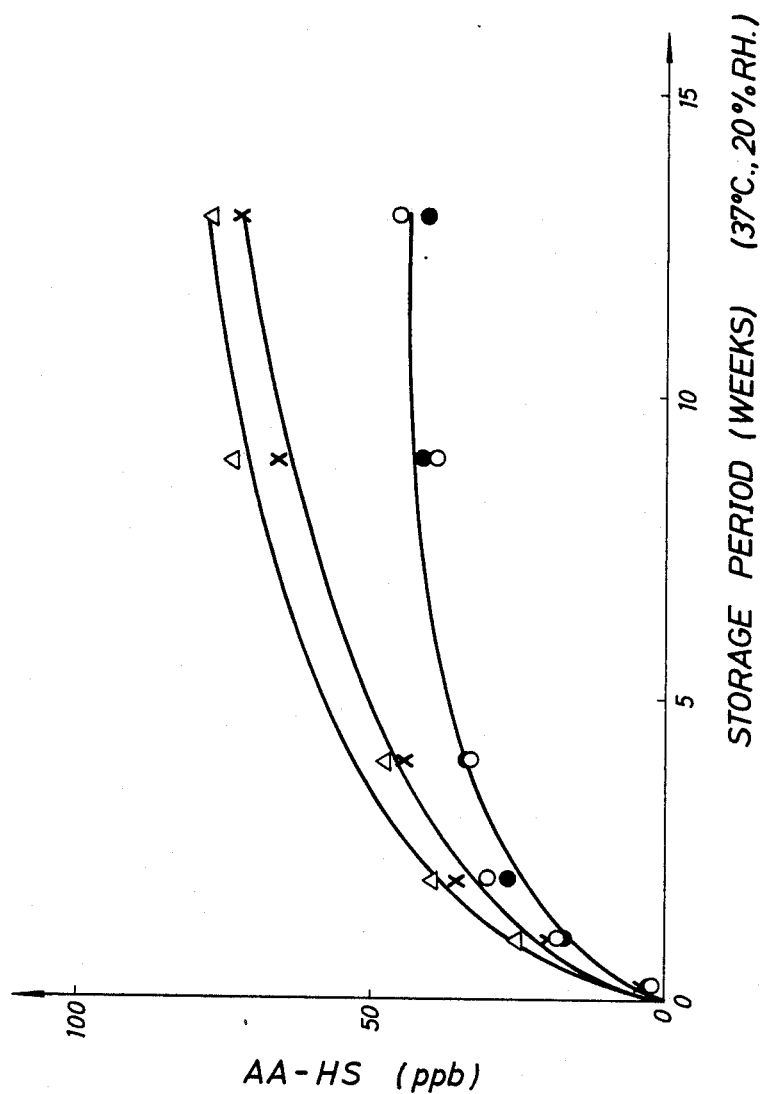
FIG. 2 is a graph illustrating the relation between the storage period and the amount (AA-HS) of acetaldehyde migrating into the space portion of the vessel in various plastic bottles prepared in Example 11. Incidentally, marks "X" and "Δ" show the results obtained when a thermoplastic polyamide was not incorporated, and marks " O " and " ● " show the results obtained when a thermoplastic polyamide was incorporated.

From FIG. 2, it is seen that in the bottles (c) and (d) containing poly-m-xylylene-adipamide (nylon MXD6), the amount of acetaldehyde migrating into the space of the vessel was significantly smaller than in the bottles (a) and (b) not containing MXD6.

Separately, with respect to each of the foregoing four bottles, the transparency and the oxygen gas permeability were determined according to the methods described in (8) and (9) above. The obtained results are shown in Table 10.

From the results shown in Table 10, it was confirmed that in the bottles (b), (c) and (d), the transparency was not substantially different from that of the bottle (a) composed solely of PET, and in the multi-layer and blend type bottles (b), (c) and (d), under the respective storage conditions the oxygen gas permeability was significantly lower than that of the bottle (a) composed solely of PET and the gas barrier property was apparently improved, and that when nylon MXD6 was incorporated in an amount as described above, the gas barrier property was not adversely influenced.

TABLE 10

| Bottle | Transparency, HZ (%) | Oxygen Gas Permeability (cc/m² · day · atm) | |
|---|---|---|---|
| | | 30° C., 20% RH | 30° C., 80% RH |
| (a) | 1.9 | 7.12 | 7.20 |
| (b) | 1.7 | 2.89 | 2.96 |
| (c) | 1.8 | 2.65 | 2.77 |
| (d) | 2.2 | 2.16 | 2.35 |

Example 12

Each of the blend and multi-layer bottles comprising the thermoplastic polyester (BRP), described in Example 11, and the comparative bottle composed solely of PET, that is, the bottles (a), (b), (c) and (d) described in detail in Example 11, was fully filled with a commercially available salad oil packed in a square can, and the mouth was sealed and the filled bottle was stored for 2 or 4 weeks in a thermostat tank (dark place) maintained at a temperature of 22° C. and a relative humidity of 60%. Then, about 200 ml of the stored salad oil was transferred into a beaker having a capacity of 300 ml and heated at about 60° C. on a hot plate.

The flavor test was carried out by 21 panelists (11 men and 10 women) according to the pair comparison method.

More specifically, two bottles were selected as the pair among the above-mentioned four bottles (a) through (d), and the panelists judged which of the pair of the bottles had a better flavor of the filled salad oil. One point was given to the bottle judged to have a better flavor of the salad oil. When it was answered that there was no substantial difference of the flavor between the pair of the bottles, 0.5 point was given to each bottle.

Table 11 shows the results of the flavor test conducted on the salad oil stored for 2 weeks in the atmosphere maintained at a temperature of 22° C. and a relative humidity of 60%, and Table 12 shows the results of the flavor test conducted on the salad oil stored for 4 weeks in the same atmosphere as described above.

In these Tables, the "win point" means the sum of the points obtained in the above-mentioned test method, and the "win level" is the value obtained by dividing the win point by the number (=21) of the panelists.

Marks " ⊙ ", " O ", "Δ", "±" and "X" in these Tables have the following meanings.

The following hypothesis (null hypothesis) is built up according to Toshio Nonaka and Toshio Sasai, "Comprehensive Mathematical Seminar", Volume 9, Seminar of Probability and Statistics, Chapter 7, Test of Hypothesis, pages 173-178, published by Morikita Shuppan, Tokyo (1961):

"In the pair comparison method, the probability that each sample of the test pair gets the point is 1/2 (=0.5). (Namely, there is no significant difference of the point between the samples of the test pair.)"

The region R where the above hypothesis is rejected (that is, denied) at a significant level of α% is expressed by the following formula:

$$R = P \pm t \times \sqrt{P \times (1-P)/N}$$

wherein P stands for the manifestation probability (=0.5), t stands for the percent point at a significant level of α% (normal distribution), and N stands for the number of panelists (N=21 in this example).

The range where the significant level α is from 0.1 to 10.0% is divided, and the region of rejection of the null hypothesis, calculated according to the above formula, and the corresponding judgement mark, are shown in Table 13.

Accordingly, each of the marks shown in Tables 11 and 12 indicate the sub-region of the rejection region R in Table 13, to which the corresponding "win level" belongs.

From Table 11, it is seen that there is no substantial difference among the above-mentioned four sample bottles in connection with the flavor of the salad oil stored for 2 weeks, and only between the multi-layer bottle (c) containing nylon MXD6 and the control bottle (a), a certain significant difference is present and it is judged that the salad oil filled in the bottle (c) has a better flavor.

From the results shown in Table 12, it is seen that in case of the storage period of 4 weeks, an obvious significant difference of the flavor resides between salad oils filled in the nylon MXD6-containing bottles (c) and (d) and salad oils filled in the MXD6-free bottles (a) and (b) and the flavor of the salad oils filled in the former bottles (c) and (d) is apparently better than the flavor of the salad oils filled in the latter bottles (a) and (b). Moreover, from the results shown in Table 12, it is seen that there is no significant difference of the flavor between the salad oil filled in the multi-layer bottle (c) containing MXD6 in the intermediate layer and the salad oil filled in the bottle (d) of the blend of BPR-A and MXD6 described in Example 11.

TABLE 11

| Sample | | (a) | (b) | (c) | (d) |
|---|---|---|---|---|---|
| (a) | win point | * | 11.5 | 5.5 | 7.0 |
| | win level | * | 0.547619 (X) | 0.261905 (Δ) | 0.333333 (X) |
| (b) | win point | 9.5 | * | 6.5 | 8.5 |
| | win level | 0.452381 (X) | * | 0.309524 (±) | 0.404762 (X) |
| (c) | win point | 15.5 | 14.5 | * | 10.0 |
| | win level | 0.738095 (Δ) | 0.690476 (±) | * | 0.476190 (X) |
| (d) | win point | 14.0 | 12.5 | 11.0 | * |
| | win level | 0.666667 (X) | 0.595238 (X) | 0.523810 (X) | * |

Note
(1) Storage conditions: 22° C., 60% RH, 2 weeks
(2) Each parenthesized mark indicates the judgement at the test.

TABLE 12

| Sample | (a) | (b) | (c) | (d) |
|---|---|---|---|---|
| (a) win point | * | 14.0 | 2.0 | 4.5 |

TABLE 12-continued

| Sample | (a) | (b) | (c) | (d) |
|---|---|---|---|---|
| win level | * | 0.666667 (X) | 0.095238 (◎) | 0.214286 (O) |
| (b) win point | 7.0 | * | 1.5 | 3.0 |
| win level | 0.333333 (X) | * | 0.071429 (◎) | 0.142857 (◎) |
| (c) win point | 19.0 | 19.5 | * | 10.5 |
| win level | 0.904762 (◎) | 0.928571 (◎) | * | 0.500000 (X) |
| (d) win point | 16.5 | 18.0 | 10.5 | * |
| win level | 0.785714 (O) | 0.857143 (◎) | 0.500000 (X) | * |

Note
(1) Storage conditions: 22° C., 60% RH, 4 weeks
(2) Each parenthesized mark indicate the judgement at the test.

TABLE 13

| Significant level $\alpha$ (%) | Region R of Rejection of Hypothesis | Judgement Mark | |
|---|---|---|---|
| $0.10 > \alpha \geq 0$ | $1.000000 \geq R > 0.838238$ $0.161762 > R \geq 0.000000$ | prominent significant difference | (◎) |
| $\alpha = 0.10$ | $R = 0.838238$ $R = 0.161762$ | prominent significant difference | (◎) |
| $1.00 > \alpha > 0.10$ | $0.838238 > R > 0.780956$ $0.219044 > R > 0.161762$ | significant difference | (O) |
| $\alpha = 1.00$ | $R = 0.780956$ $R = 0.219044$ | significant difference | (O) |
| $5.00 > \alpha > 1.00$ | $0.780956 > R > 0.713854$ $0.286146 > R > 0.219044$ | slight significant difference | (△) |
| $\alpha = 5.00$ | $R = 0.713854$ $R = 0.286146$ | slight significant difference | (△) |
| $10.0 > \alpha > 5.00$ | $0.713854 > R > 0.679484$ $0.320516 > R > 0.286146$ | trend of significant difference | (±) |
| $\alpha = 10.0$ | $R = 0.679484$ $R = 0.320516$ | trend of significant difference | (±) |
| $100 \geq \alpha > 10.0$ | $0.679484 > R \geq 0.500000$ $0.500000 \geq R > 0.320516$ | no significant difference | (X) |

Example 13

Each of the blend and multi-layer bottles comprising the thermoplastic polyester (BPR), described in Example 11, and the comparative bottle composed solely of PET, that is, the bottles (a), (b), (c) and (d) described in detail in Example 11, was fully filled with a commercially available carbonated drink packed in a glass bottle, and the mouth was sealed and the bottle was stored for 2 or 4 weeks in a thermostat tank (dark place) maintained at a temperature of 22° C. and a relative humidity of 60%.

By 21 panelists (11 men and 10 women), the flavor test was carried out according to the pair comparison method. Namely, two bottles were selected among the four bottles (a), (b), (c) and (d), and the carbonated drinks stored in the two bottles were tasted and it was judged which of the carbonated drinks had a better flavor. One point was given to the bottle in which the carbonated drink judged to have a better taste had been filled, and it it was answered that there was no difference of the flavor between the carbonated drinks filled in the two bottles, 0.5 point was given to each bottle.

Table 14 shows the results of the test conducted on the carbonated drink stored in the atmosphere maintained at 22° C. and 60% RH for 2 weeks, and Table 15 shows the results of the flavor test conducted on the carbonated drink stored for 4 weeks in the same atmosphere.

Incidentally, "win point", "win level" and marks "◎", "O", "△", "±" and "X" are as defined in Example 12.

From the results shown in Table 14, it is seen that no substantial difference is present among the above-mentioned four bottles in connection with the flavor of the carbonated drink stored for 2 weeks, and only a slight significant difference resides between the multi-layer and blend bottles (c) and (d) containing nylon MXD6, described in Example 11, and the MXD6-free bottles (a) and (b) and it is judged that the carbonated drink filled in the bottles (c) and (d) has a slightly better flavor.

From the results shown in Table 15, it is seen that in case of the storage period of 4 weeks, there is a prominent significant difference between the carbonated drinks filled in the nylon MXD6-containing bottles (c) and (d) described in Example 11 and the carbonated drinks filled in the MXD6-free bottles (a) and (b) and the flavor of the carbonated drinks filled in the former bottles (c) and (d) is apparently better than the flavor of the carbonated drinks filled in the latter bottles (a) and (b). Furthermore, from the results shown in Table 15, it is seen that there is no significant difference of the flavor between the carbonated drink filled in the multi-layer bottle (c) containing MXD6 in the intermediate layer and the carbonated drink filled in the bottle (d) of the blend of BPR-A and MXD6.

TABLE 14

| Sample | (a) | (b) | (c) | (d) |
|---|---|---|---|---|
| (a) win point | * | 10.5 | 5.5 | 7.0 |
| win level | * | 0.500000 (X) | 0.261905 (△) | 0.333333 (X) |
| (b) win point | 10.5 | * | 5.0 | 6.0 |
| win level | 0.500000 (X) | * | 0.238095 (△) | 0.285714 (△) |
| (c) win point | 15.5 | 16.0 | * | 11.5 |

TABLE 14-continued

| Sample | (a) | (b) | (c) | (d) |
|---|---|---|---|---|
| win level | 0.738095 (Δ) | 0.761905 (Δ) | * | 0.547619 (X) |
| (d) win point | 14.0 | 15.0 | 9.5 | * |
| win level | 0.666667 (X) | 0.714286 (Δ) | 0.452381 (X) | * |

Note
(1) Storage conditions: 22° C., 60% RH, 2 weeks
(2) Each parenthesized mark indicates the judgement at the test (see Table 13).

TABLE 15

| Sample | (a) | (b) | (c) | (d) |
|---|---|---|---|---|
| (a) win point | * | 13.5 | 2.0 | 4.0 |
| win level | * | 0.642857 (X) | 0.095238 (◎) | 0.190476 (O) |
| (b) win point | 7.5 | * | 2.0 | 3.5 |
| win level | 0.357143 (X) | * | 0.095238 (◎) | 0.166667 (O) |
| (c) win point | 19.0 | 19.0 | * | 7.5 |
| win level | 0.904762 (◎) | 0.904762 (◎) | * | 0.357143 (X) |
| (d) win point | 17.0 | 17.5 | 13.5 | * |
| win level | 0.809524 (O) | 0.833333 (O) | 0.642857 (X) | * |

Note
(1) Storage conditions: 22° C., 60% RH, 4 weeks
(2) Each parenthesized mark indicates the judgement at the test (see Table 13).

Example 14

Each of the blend and multi-layer bottles comprising the thermoplastic polyester (BPR), described in Example 11, and the comparative bottle composed solely of PET, that is, the bottles (a), (b), (c) and (d) described in detail in Example 11, was fully filled with commercially available mineral water packed in a glass bottle, and the mouth was sealed and the bottle was stored for 2 or 4 weeks in a thermostat tank (dark place) maintained at a temperature of 22° C. and a relative humidity of 60%.

By 21 panelists (11 men and 10 women), the flavor test was carried out according to the pair comparison method. Namely, two bottles were selected among the four bottles (a), (b), (c) and (d), and the mineral waters stored in the two bottles were tasted and it was judged which of the mineral waters had a better flavor. One point was given to the bottle in which the mineral water judged to have a better taste had been filled, and if it was answered that there was no difference of the flavor between the mineral waters filled in the two bottles, 0.5 point was given to each bottle.

Table 16 shows the results of the test conducted on the mineral water stored in the atmosphere maintained at 22° C. and 60% RH for 2 weeks, and Table 17 shows the results of the flavor test conducted on the mineral water stored for 4 weeks in the same atmosphere.

Incidentally, "win point", "win level" and marks " ◎ " " O ", "Δ", "±" and "X" are as defined in Example 12.

From Tables 16 and 17, it is seen that the results obtained at the test conducted on mineral water are not substantially different from the results obtained at the test conducted on the carbonated drink, described in Example 13. However, the general tendency is more prominent in case of mineral water than in case of the carbonated drink (Example 13), and from Table 16, it is seen that even in case of the storage period of two weeks, the tasted of the mineral water filled in the multi-layer bottle (b) free of nylon MXD6, described in Example 11, is apparently inferior to the taste of the mineral water stored in the MXD6-containing bottle (c) or (d).

TABLE 16

| Sample | (a) | (b) | (c) | (d) |
|---|---|---|---|---|
| (a) win point | * | 10.0 | 4.5 | 6.5 |
| win level | * | 0.476190 (X) | 0.214286 (O) | 0.309524 (±) |
| (b) win point | 11.0 | * | 3.0 | 2.0 |
| win level | 0.523810 (X) | * | 0.142857 (◎) | 0.095238 (◎) |
| (c) win point | 16.5 | 18.0 | * | 10.0 |
| win level | 0.785714 (O) | 0.857143 (◎) | * | 0.476190 (X) |
| (d) win point | 14.5 | 19.0 | 11.0 | * |
| win level | 0.690476 (±) | 0.904762 (◎) | 0.523810 (X) | * |

Note
(1) Storage conditions: 22° C., 60% RH, 2 weeks
(2) Each parenthesized mark indicates the judgement at the test (see Table 13).

point was given to each bottle.

TABLE 17

| Sample | (a) | (b) | (c) | (d) |
|---|---|---|---|---|
| (a) win point | * | 12.5 | 1.5 | 3.0 |
| win level | * | 0.595238 (X) | 0.071429 (◎) | 0.142857 (◎) |
| (b) win point | 8.5 | * | 1.0 | 2.5 |
| win level | 0.404762 (X) | * | 0.047619 (◎) | 0.119048 (◎) |
| (c) win point | 19.5 | 20.0 | * | 11.0 |
| win level | 0.928571 (◎) | 0.952381 (◎) | * | 0.523810 (X) |
| (d) win point | 18.0 | 18.5 | 10.0 | * |

TABLE 17-continued

| Sample | (a) | (b) | (c) | (d) |
|---|---|---|---|---|
| win level | 0.857143 (⊚) | 0.880952 (⊚) | 0.476190 (X) | * |

Note
(1) Storage conditions: 22° C., 60% RH, 4 weeks
(2) Each parenthesized mark indicates the judgement at the test (see Table 13).

Example 15

To 100 parts by weight of polyethylene terephthalate (PET-A) having an inherent viscosity (IV) of 0.75 dl/g was added 1.0 part by weight (often referred to as "PHR" hereinafter) of polyoxyethylene diamine (POEDA) having a molecular weight of 8000, an amino group concentration of 25.0 meq/100 g and an organic/(organic+inorganic) ratio of 0.66 as the primary amino group-containing compound, and the mixture was dry-blended at room temperature for 10 minutes by using a trumbler type dry blender.

The obtained dry blend was formed into a preform having a weight of 37 g and a thickness of 2.6 mm by using an injection molding machine, Model FS-170N supplied by Nissei Jushi Kogyo K.K., under the following injection conditions.

(1) Set Barrel Temperature 250° C. (rear part), 265° C. (intermediate part), 271° C. (front part), 272° C.V (nozzle part)
(2) Screw Rotation Number 70 rpm
(3) Injection Pressure 46 kg/cm$^2$
(4) Temperature of Cooling Water 11° C.
(5) Forming Cycle 36 seconds For comparison, a preform (having a weight of 37 g and a thickness of 2.6 mm) composed solely of PET-A was formed by using the above-mentioned injection molding machine under the above-mentioned molding conditions.

From the so-obtained preform composed solely of PET-A and the preform of the blend of PET-A and 1.0 PHR of polyoxyethylene diamine, cylindrical bottles having a full inner volume of about 1035 ml (the weight was 37 g) were formed by a biaxial draw-blow forming machine, Model OBM-1G supplied by Toyo Shokuhin Kikai K.K. Namely, the preform was heated at 100° C. for 30 seconds and blow forming was carried out for 4 seconds in the mold.

With respect to each of the so-obtained two biaxially draw-blow-formed bottles, the acetaldehyde amount (AA-M) in the bottle material was determined according to the method described in (6) above.

It was found that AA-M in the bottle composed solely of PET-A was 5.9 ppm but AA-M in the bottle of the blend of PET-A and 1.0 PHR of polyoxyethylene diamine (POEDA) was 0.2 ppm.

Namely, it was confirmed that by addition of 1.0 PHR of POEDA, the acetaldehyde residual ratio in the bottle material could be reduced to about 3%.

Furthermore, with respect to each of the above-mentioned two biaxially draw-blow-formed bottles, the transparency (haze, HZ) of the central part of the barrel was measured according to the method described in (8) above. HZ of the bottle composed solely of PET-A was 1.7% and HZ of the bottle composed of the above-mentioned blend was 1.7%, and no substantial significant difference of the transparency was observed.

Example 16

To 10 kg of polyethylene terephthalate (PET-B) having an inherent viscosity (IV) of 0.65 dl/g was added 10 g of a powder of spiroacetal diamine (SADA) pulverized in liquid nitrogen, which had a molecular weight of 274.4, an amino group concentration of 729 meq/100 g and an organic/(organic+inorganic) ratio of 0.50, as the primary amino group-containing compound, and they were intimately mixed by a Henschel mixer and pelletized by a pelletizer (the set temperature of the cylinder portion was 265° C. and the screw rotation number was 30 rpm) to obtain a PET-A/SADA master batch (pellet).

The following three dry blends were obtained by dry-blending the so-obtained master batch with a chip (pellet) of PET-B by the same tumbler type dry blender as described in Example 15.

(1) master batch/PET-B=1/200=0.0005 PHR
(2) master batch/PET-B=1/100=0.001 PHR
(3) master batch/PET-B=1/10=0.01 PHR From the so-obtained three dry blends and PeT-B alone, cylindrical bottles having a full inner volume of about 1035 ml (the weight was 37 g) were formed by the same injection molding maching and biaxial draw-blow forming machine as described in Example 15 under the same injection and blow-forming conditions as described in Example 15.

With respect to each of the so-obtained four biaxially draw-blow-formed bottles, the acetaldehyde amount (AA-M) in the bottle material was measured according to the method described in (6) above. The obtained results are shown in Table 18.

From the results shown in Table 18, it was confirmed that even if the amount added of spiroacetal diamine (SADA) was as small as described above, the effect of reducing the acetaldehyde concentration was very excellent.

With respect to each of the above-mentioned four biaxially draw-blow-formed bottles, the transparency (haze, HZ) of the central part of the barrel was determined according to the method described in (8) above. The obtained results are shown in Table 18. It was confirmed that if the amount added of spiroacetal diamine was within the above-mentioned range, there was no substantial significant difference of the transparency.

TABLE 18

| Amount of PET (parts by weight) | Amount of SADA (PHR) | AA—M (ppm) | Acetaldehyde Residual Ratio (%) | Transparency, HZ (%) |
|---|---|---|---|---|
| 100 | 0 | 46.5 | 100 | 1.6 |
| 100 | 0.0005 | 11.3 | 24.3 | 1.4 |
| 100 | 0.001 | 6.1 | 13.1 | 1.5 |
| 100 | 0.01 | 1.7 | 3.7 | 1.5 |

Thermoplastic polyester: PET—B (IV = 0.65)
Primary amino group-containing compound: spiroacetal diamine (SADA, amino group concentration = 729)

Example 17

A dry blend comprising 100 parts by weight of the same polyethylene terephthalate (PET-A) as described in Example 15 and 0.5 part by weight of spiroguanamine (SGA) having a molecular weight of 434.2, an amino group concentration of 921 meq/100 g and an organic/-(organic+inorganic) ratio of 0.28 as the amino group-containing compound was supplied to a main projecting machine of a co-injection/bi-axially draw-blow forming machine, Model ASB-250TH supplied by Nissei ASB Kikai K.K., and a dry blend (GFP) comprising 100 parts by weight of a thermoplastic polyester (BPR-A) comprising in the polymer chain a terephthalic acid component and an isophthalic acid component at a molar ratio of 70/30 and an ethylene glycol component and a bis(2-hydroxyethoxy)benzene component at a molar ratio of 95/5 and having an inherent viscosity (IV) of 0.69 dl/g and 0.5 part by weight of the above-mentioned spiroguanamine (SGA) was supplied to a subsidiary injection machine of the above-mentioned forming machine. A multi-layer preform having a weight of 59 g and a total thickness of 4.1 mm, in which the inner layer (PET-SGA blend)/ intermediate layer (GFP)/outer layer (PET-SGA blend) thickness ratio was 0.5/1/1.5, was prepared under the following conditions.

(1) Set Temperature of Main Injection Machine 280° C. (rear part), 280° C. (intermediate part), 285° C. (nozzle part)

(2) Set Temperature of Subsidiary Injection Machine 195° C. (rear part), 215° C. (intermediate part), 215° C. (nozzle part)

(3) Set Temperature of Nozzle part of Hot Runner 285° C.

(4) Primary Injection Pressure for PET-SGA DRy Blend 125° C. kg/cm$^2$ (gauge)

(5) Injection Pressure for GFP 150 kg/cm$^2$ (gauge)

(6) Secondary Injection Pressure for PET-SGA Dry Blend 95 kg/cm$^2$ (gauge)

Then, in the blow-forming zone, a cylindrical multi-layer bottle having a weight of 59 g and a full inner volume of 1520 ml was prepared from the so-obtained multi-layer preform by carrying out draw-blow forming at a draw ratio of 2.5 in the longitudinal (axial) direction and a draw ratio of 3.5 in the lateral (circumferential) direction under the following condition.

(7) Heating Temperature for Multi-Layer Preform 100° C.

Separately, by using only the main injection machine of the above-mentioned co-injection/biaxial draw-blow forming machine, a bottle having the same weight and shape as described above was formed from the above-mentioned polyethylene terephthalate (PET-A) alone under the same conditions as described above.

With respect to each of the so-obtained two biaxially draw-blow-formed bottles, the acetaldehyde amount (AA-M) in the bottle material was determined according to the method described in (6) above. The acetaldehyde amount (AA-M) in the bottle composed solely of PET-A was 8.6 ppm, but the acetaldehyde amount (AA-M) of the multi-layer bottle containing 0.5 part by weight of the above-mentioned spiroguanamine (SGA) in all the layers was 0.4 ppm. Accordingly, it was confirmed that the acetaldehyde residual ratio in the bottle material was reduced to about 5% by addition of 0.5 part by weight of SGA.

With respect to each of these two single-layer and multi-layer bottles, the transparency (haze, HZ) of the central part of the barrel was determined according to the method described in (8) above. HZ of the single layer of PET-A was 1.9% and HZ of the multi-layer bottle was 1.6%. No substantial significant different of the transparency was observed.

Furthermore, with respect to each of the single-layer bottle of PET-A and the multi-layer bottle, the oxygen gas permeability was determined under conditions of (1) a temperature of 30° C. and a relative humidity of 20% and (2) a temperature of 30° C. and a relative humidity of 80% according to the method described in (9) above.

Under the conditions (1), the oxygen gas permeability of the single-layer bottle of PET-A was 7.12 and the oxygen gas permeability of the multi-layer bottle was 2.60, and under the conditions (2), the oxygen gas permeability of the single-layer bottle of PET-A was 7.20 and the oxygen gas permeability of the multi-layer bottle was 2.63 (the unit being cc/m$^2$ day atm). Accordingly, it was confirmed that a prominent effect of improving the gas barrier property was attained by the presence of the above-mentioned BPR as the intermediate layer.

Example 18

Each of the following four bottles was fully filled with a commercially available salad oil packed in a 1400-g square can, and the mouth was sealed and the filled bottle was stored for 7 days in a thermostat chamber (dark place) maintained at 37° C.

(A) Bottle composed solely of polyethylene terephthalate (PET-A), described in Example 17 (control, weight=59 g, full inner volume=1520 ml)

(B) Bottle of blend comprising 100 parts by weight of PET-A and 1.0 part by weight of polyoxyethylene diamine, described in Example 15 (weight=37 g, full inner volume=1035 ml)

(C) Bottle of blend comprising 100 parts by weight of PET-B and 0.01 part by weight (PHR) of spiroacetal diamine, described in Example 16 (weight=37 g, full inner volume=1035 ml)

(D) Multi-layer bottle having layer of blend comprising 100 parts by weight of PET-A and 0.5 part by weight of spiroguanamine and layer of blend comprising 100 parts by weight of BPR and 0.5 part by weight of spiroguanidine, described in Example 17 (weight=59 g, full inner volume=1520 ml)

After the storage, about 200 ml of the salad oil was transferred into a 300-ml beaker and was heated at about 60° C. on a hot plate. Separately, about 200 ml of the salad oil, which had been packed in the square can, just after opening of the can, was transferred to a 300-ml beaker and was heated at about 60° C. on a hot plate in the same manner as described above.

By 21 panelists, the flavor test was carried out in the following manner. Namely, with respect to each of the following pairs of the salad oils, the salad oil having a flavor closer to the flavor of the salad oil, which had been packed in the square can, just after opening of the can, was determined by each panelist.

(1) salad oil filled in bottle (A) and salad oil filled in bottle (B)

(2) salad oil filled in bottle (A) and salad oil filled in bottle (C)

(3) salad oil filled in bottle (A) and salad oil filled in bottle (D)

At the flavor test (1), among the 21 panelists, 20 panelists answered that the salad oil filled in the bottle (B) had a flavor closer to the flavor of the salad oil packed in the square can and the remaining one panelist answered that there was no substantial difference.

At the flavor test (2), among the 21 panelists, 16 panelists answered that the flavor of the salad oil filled in the bottle (C) was closer to that of the salad oil packed in the square can and two panelists answered that the salad oil filled in the bottle (A) had a flavor closer to that of the salad oil packed in the square can, while the remaining three panelists answered that there was no substantial difference.

At the flavor test (3), among the 21 panelists, 18 panelists answered that the salad oil filled in the bottle (D) had a flavor closer to that of the salad oil packed in the square can and the remaining three panelists answered that there was no substantial difference.

In view of the foregoing test results, it will be readily understood that if a small amount of a specific primary amino group-containing compound is incorporated into a thermoplastic polyester, the effect of retaining the flavor and fragrance of a content filled in a vessel formed of the polyester is prominently improved.

What we claim is:

1. A heat-molded or draw-formed plastic vessel composed of a thermoplastic polyester composition comprising (A) a thermoplastic polyester having ethylene terephthalate units and (B) $3 \times 10^{-7}$ to 10.0% by weight, based on the polyester, of a thermoplastic polyamide having a terminal amino group at a concentration of 0.05 to 50 millimoles per 100 g of the resin, said thermoplastic polyamide being a polymerized fatty acid polyamide obtained by polycondensation of (i) a polymerized fatty acid formed by polymerizing an unsaturated fatty acid with (ii) a diamine.

2. A vessel as set forth in claim 1, wherein the thermoplastic polyester (A) is polyethylene terephthalate.

3. A vessel as set forth in claim 1, wherein the thermoplastic polyester (A) is a copolyester comprising in the polymer chain a terephthalic acid component and an isophthalic acid component at a molar ratio of from 95/5 to 5/95 and an ethylene glycol component and a bis(2-hydroxyethoxy)benzene component at a molar ratio of from 99.999/0.001 to 2.0/98.0.

4. A vessel as set forth in claim 1, wherein the polyamide (B) is incorporated in an amount of $5 \times 10^{-7}$ to 10.0% by weight based on the thermoplastic polyester (A).

5. A vessel as set forth in claim 1, wherein the polyamide (B) is incorporated in an amount of $5 \times 10^{-4}$ to 5.0% by weight based on the thermoplastic polyester (A).

6. A vessel as set forth in claim 1, wherein the terminal amino group concentration in the polyamide (B) is 0.1 to 40 millimoles per 100 g of the resin.

7. A vessel as set forth in claim 3, which is a multi-layer vessel comprising a layer of said thermoplastic polyester composition as a gas barrier layer.

8. A vessel as set forth in claim 7, which is obtained by forming a laminate having a layer of said thermoplastic polyester composition by co-injection molding and molding the laminate into a vessel.

9. A vessel as set forth in claim 1, wherein said polymerized fatty acid polyamide is a polyamide of dimerized linoleic acid with hexamethylene-diamine.

10. A polyester vessel having an improved flavor-retaining property, which is composed of a resin composition comprising (A) a thermoplastic polyester and (C) $5 \times 10^{-}$ to 3.0% by weight, based on the polyester, of a primary amino group-containing compound having a molecular weight of at least 100, said compound being selected from the group consisting of polyoxyethylene diamine, spiroacetal diamine and spiroguanamine.

11. A polyester vessel as set forth in claim 10, wherein the amino group-containing compound (C) is a compound having a molecular weight of at least 100 and containing a primary amino group at a concentration of 0.05 to 3000 meq/100 g.

12. A vessel as set forth in claim 10, wherein the thermoplastic polyester (A) is polyethylene terephthalate.

13. A vessel as set forth in claim 10, wherein the thermoplastic polyester (A) is a copolyester comprising in the polymer chain a terephthalic acid component and isophthalic acid component at a molar ratio of from 95/5 to 5/95 and an ethylene glycol component and a bis(2-hydroxyethoxy)benzene component at a molar ratio of from 99.999/0.001 to 2.0/98.0.

14. A polyester vessel as set forth in claim 13, which is a multi-layer vessel comprising a layer of said resin composition as a gas barrier layer.

15. A polyester vessel as set forth in claim 10, which is obtained by forming a laminate having a layer of said resin composition by co-injection molding and molding the laminate into a vessel.

16. A method for reducing the acetaldehyde concentration in a heat-molded polyester vessel, which comprises dry-blending a thermoplastic polyester with $3 \times 10^{-}$ to 10.0% by weight, based on the polyester, of a thermoplastic polyamide having a terminal amino group at a concentration of 0.05 to 50 millimoles per 100 g of the resin, melt-kneading the composition and thermoforming the melt-kneaded composition into a vessel, wherein said thermoplastic polyamide is a polymerized fatty acid polyamide obtained by polycondensation of (i) a polymerized fatty acid formed by polymerizing an unsaturated fatty acid with (ii) a diamine.

17. A method for reducing the acetaldehyde concentration in a heat-molded polyester vessel, which comprises dry-blending a thermoplastic polyester with $5 \times 10^{-7}$ to 3.0% by weight, based on the polyester, of a primary amino group-containing compound having a molecular weight of at least 100, melt-kneading the composition and thermoforming the melt-kneaded composition into a vessel, wherein said compound is selected from the group consisting of polyoxyethylene diamine, spiroacetal diamine and spiroguanamine.

* * * * *